United States Patent
Nagasaka

(10) Patent No.: US 10,861,321 B2
(45) Date of Patent: Dec. 8, 2020

(54) INFORMATION PROCESSING DEVICE AND INFORMATION PROCESSING METHOD

(71) Applicant: SONY CORPORATION, Tokyo (JP)

(72) Inventor: Hideo Nagasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/063,293

(22) PCT Filed: Sep. 29, 2016

(86) PCT No.: PCT/JP2016/078956
§ 371 (c)(1),
(2) Date: Jun. 18, 2018

(87) PCT Pub. No.: WO2017/119161
PCT Pub. Date: Jul. 13, 2017

(65) Prior Publication Data
US 2018/0374339 A1    Dec. 27, 2018

(30) Foreign Application Priority Data

Jan. 7, 2016 (JP) .................................. 2016-001671

(51) Int. Cl.
*G08C 19/16* (2006.01)
*G08C 17/00* (2006.01)
(Continued)

(52) U.S. Cl.
CPC ............... *G08C 17/00* (2013.01); *G06F 3/01* (2013.01); *G06F 3/16* (2013.01); *G06F 3/167* (2013.01);
(Continued)

(58) Field of Classification Search
CPC ... G06F 3/01; G06F 3/16; G06F 3/167; G08C 17/00; G08C 17/02; G08C 2201/30;
(Continued)

(56) References Cited

U.S. PATENT DOCUMENTS 9,165,455 B1   10/2015 Hutz
9,430,931 B1 *  8/2016 Liu .................... G08B 21/24
(Continued)

FOREIGN PATENT DOCUMENTS

AU    2010228130 A1    4/2016
CA    2756369 A1    9/2010
(Continued)

OTHER PUBLICATIONS

Extended European Search Report of EP Patent Application No. 16883662.5, dated Oct. 18, 2018, 08 pages.
(Continued)

*Primary Examiner* — Naomi J Small
(74) *Attorney, Agent, or Firm* — Chip Law Group

(57) ABSTRACT

An information processing device including a determination unit that determines a user interface for controlling a control target device in accordance with a communication scheme between the control target device and the information processing device for controlling the control target device and a notification control unit that controls a notification to a user of the user interface that is determined by the determination unit. An information processing method and a program corresponding to the information processing device.

21 Claims, 17 Drawing Sheets

(51) Int. Cl.

| | |
|---|---|
| *H04N 5/00* | (2011.01) |
| *H04Q 9/00* | (2006.01) |
| *H04M 11/00* | (2006.01) |
| *G06F 3/01* | (2006.01) |
| *G06F 3/16* | (2006.01) |
| *G08C 17/02* | (2006.01) |
| *H04L 12/28* | (2006.01) |

(52) U.S. Cl.
CPC ............ *G08C 17/02* (2013.01); *H04L 12/281* (2013.01); *H04L 12/282* (2013.01); *H04L 12/2814* (2013.01); *H04M 11/00* (2013.01); *H04N 5/00* (2013.01); *H04Q 9/00* (2013.01); *G08C 2201/30* (2013.01); *G08C 2201/31* (2013.01); *G08C 2201/50* (2013.01); *G08C 2201/92* (2013.01)

(58) Field of Classification Search
CPC ............ G08C 2201/31; G08C 2201/50; G08C 2201/92; H04L 12/281; H04L 12/2814; H04L 12/282; H04M 11/00; H04N 5/00; H04Q 9/00
USPC ........................................................ 340/12.22
See application file for complete search history.

(56) References Cited

U.S. PATENT DOCUMENTS

| | | |
|---|---|---|
| 2003/0189509 A1 | 10/2003 | Hayes et al. |
| 2005/0159823 A1 | 7/2005 | Hayes et al. |
| 2008/0171579 A1* | 7/2008 | Grubek .................. H04B 1/202 |
| | | 455/563 |
| 2009/0072991 A1 | 3/2009 | Hayashi et al. |
| 2010/0019918 A1* | 1/2010 | Avital .................... A61B 90/11 |
| | | 340/686.4 |
| 2012/0021684 A1 | 1/2012 | Schultz et al. |
| 2013/0171981 A1* | 7/2013 | Woo .................. H04L 12/40013 |
| | | 455/420 |
| 2015/0160797 A1* | 6/2015 | Shearer ............... H04L 12/2816 |
| | | 715/740 |
| 2015/0194048 A1* | 7/2015 | Haubrich ............... G08C 17/02 |
| | | 340/12.5 |
| 2015/0199899 A1* | 7/2015 | Tanaka .................. G08C 17/02 |
| | | 340/12.5 |

FOREIGN PATENT DOCUMENTS

| | | |
|---|---|---|
| CN | 101394448 A | 3/2009 |
| CN | 102422552 A | 4/2012 |
| EP | 2412107 A1 | 2/2012 |
| JP | 2006-246021 A | 9/2006 |
| JP | 2009-075735 A | 4/2009 |
| JP | 2012-521685 A | 9/2012 |
| JP | 2013-196223 A | 9/2013 |
| KR | 10-2012-0005468 A | 1/2012 |
| WO | 2010/108235 A1 | 9/2010 |

OTHER PUBLICATIONS

International Search Report and Written Opinion of PCT Application No. PCT/JP2016/078956, dated Dec. 13, 2016, 09 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/078956 filed on Sep. 29, 2016, which claims priority benefit of Japanese Patent Application No. JP 2016-001671 filed in the Japan Patent Office on Jan. 7, 2016. Each of the above-referenced applications is hereby incorporated herein by reference in its entirety.

TECHNICAL FIELD

The present disclosure relates to an information processing device, an information processing method, and a program.

BACKGROUND ART

Technologies for controlling home appliances (which will also be referred to as home appliances) through communication have been researched and developed currently. For example, there is a technology for causing a plurality of home appliances to collaborate with each other by connecting the plurality of home appliances on a network and communicating control signals to the plurality of home appliances via the network, or the like.

Here, control details of the plurality of home appliances are normally different from each other. For this reason, a user individually sets control details of each of the home appliances. This setting may be complicated and even become a burden to the user.

With regard to this matter, Patent Literature 1 discloses an invention related to an agent device which learns settings of control details of each of home appliances and generates setting macros of the control details from a learning result. For example, the agent device learns operation control information of a plurality of electronic apparatuses transmitted from a remote controller and generates macros for controlling operations of the plurality of electric apparatuses on the basis of a learning result. It is described that user's convenience is improved accordingly.

CITATION LIST

Patent Literature

Patent Literature 1: JP 2014-093783A

DISCLOSURE OF INVENTION

Technical Problem

However, in the related art represented by the invention disclosed in Patent Literature 1, there is no mention of a user interface (which will also be referred to as a "UI" below) prepared for controlling home appliances to be controlled (which will also be referred to as "control target devices" below). Thus, there may be a case in which it is difficult for a user to select a suitable UI for controlling the control target devices. For example, there may be a case in which a plurality of UIs are available and there is another UI that is more convenient than a UI recognized by the user. In this case, in the related art, unless the user actively or coincidentally recognizes the other UI, it would be difficult for the user to use the other UI.

Therefore, the present disclosure proposes a mechanism that can improve user's convenience in controlling a control target device.

Solution to Problem

According to the present disclosure, there is provided an information processing device including: a determination unit that determines a user interface for controlling a control target device in accordance with a communication scheme between the control target device and the information processing device for controlling the control target device; and a notification control unit that controls a notification to a user of the user interface that is determined by the determination unit.

In addition, according to the present disclosure, there is provided an information processing method including, by a processor: determining a user interface for controlling a control target device in accordance with a communication scheme between the control target device and an information processing device for controlling the control target device; and controlling a notification to a user of the determined user interface.

In addition, according to the present disclosure, there is provided a program for causing a computer to realize: a determination function that determines a user interface for controlling a control target device in accordance with a communication scheme between the control target device and an information processing device for controlling the control target device; and a notification control function that controls a notification to a user of the user interface determined by the determination function.

Advantageous Effects of Invention

According to the present disclosure, a mechanism that can improve user's convenience in controlling a control target device is provided as described above. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
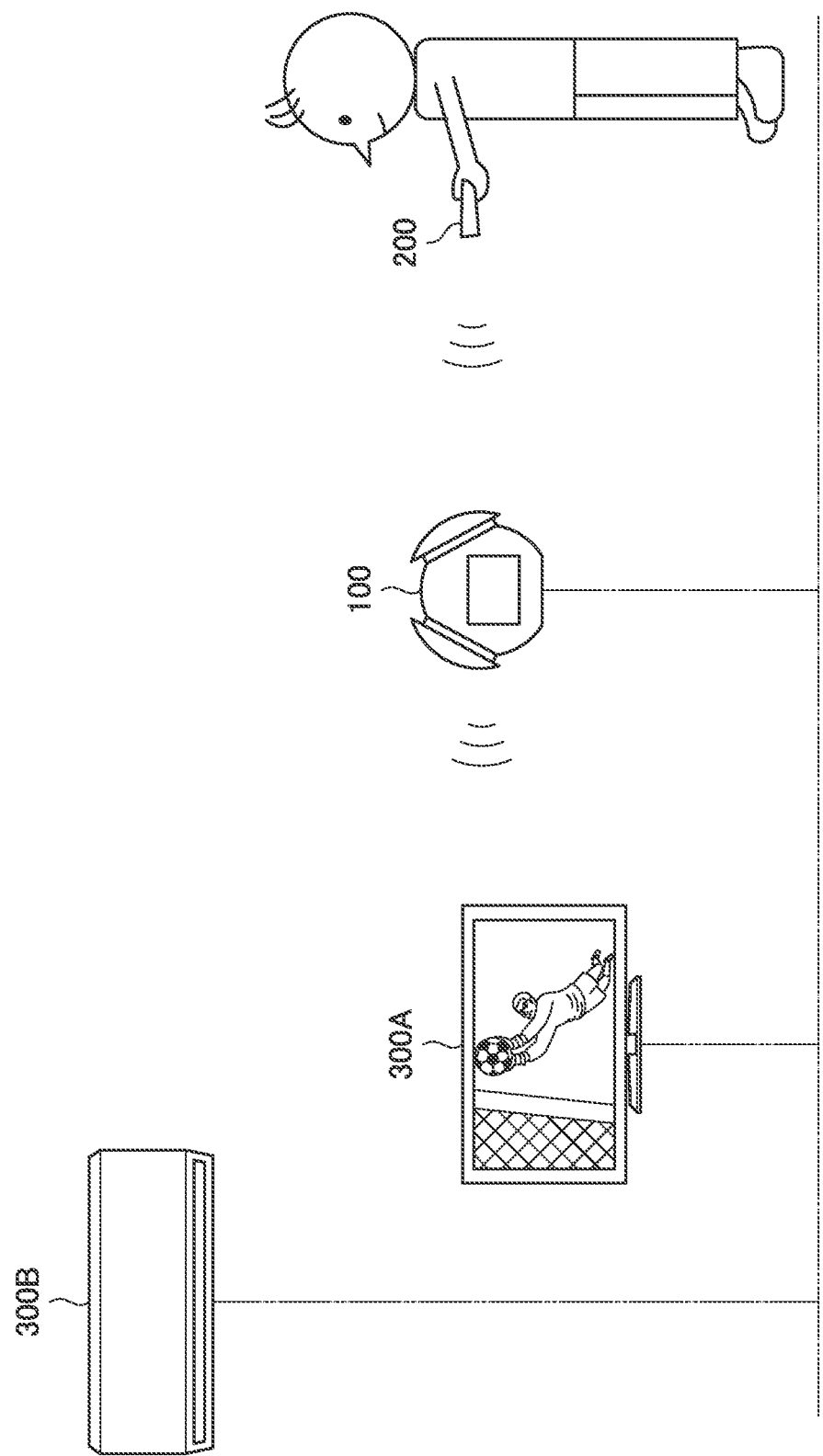
FIG. 1 is a diagram for describing an overview of an information processing system according to each embodiment of the present disclosure.

Hereinafter, (a) preferred embodiment (s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are also cases in which a plurality of components having substantially the same function and structure are distinguished by adding different letters to the end of the same reference numeral. For example, a plurality of components having substantially the same function are distinguished as necessary like a control target device 300A and a control target device 300B. However, in a case where it is unnecessary to distinguish components having substantially the same function and structure, only the same reference numeral is added. For example, in a case in which it is unnecessary to particularly distinguish the control target device 300A from the control target device 300B, they are referred to simply as "control target devices 300."

Note that description will be provided in the following order.
1. Overview of information processing system
2. First embodiment (notification of control UI of control target device)
2-1. Logical configuration of system
2-2. Physical configuration of device
2-3. Logical configuration of device
2-4. Process of device
2-5. Application examples
2-6. Summary of first embodiment
2-7. Modification example
3. Second embodiment (proposal for control of control target device)
3-1. Logical configuration of system
3-2. Logical configuration of device
3-3. Process of device
3-4. Application example
3-5. Summary of second embodiment
4. Conclusion 1. Overview of Information Processing System First, an overview of an information processing system according to each embodiment of the present disclosure will be described with reference to FIG. 1. FIG. 1 is a diagram for describing an overview of an information processing system according to each embodiment of the present disclosure.

The information processing system includes a control device and a control target device that have communication functions. The control device controls the control target device by transmitting information for controlling the control target device (which will also be referred to as control information below) to the control target device. In addition, the control target device performs processing on the basis of the received control information.

The information processing system includes, for example, a remote controller 200 as a control device, and a display device 300A and an air conditioning (which will also be referred to as "AC" below) device 300B as control target devices as illustrated in FIG. 1. The remote controller 200 transmits control information to the display device 300A or the AC device 300B using an infrared communication scheme in accordance with a user operation. The display device 300A and the AC device 300B perform activation, termination, change of processing details, or the like on the basis of the received control information.

Here, there is a case in which there are a plurality of control methods, i.e., UIs, of the control target devices. For example, control of the display device 300A can be performed using a control application installed in a communication terminal such as a smartphone, in addition to the remote controller 200. Meanwhile, it is difficult for a user to ascertain a UI other than the UI known to the user. For example, in order to know how to control the control target devices using the above-described control application in a case in which the user knows how to control the control target devices using the remote controller 200, the user himself/herself needs to notice a possibility of another UI being present and acquire information regarding the other UI. However, because it is actually possible to perform control using the remote controller 200, it is considered that the user may not absolutely search for another UI spending time. In addition, the user may not concern of whether there is another UI in the first place. Therefore, there is a case in which the user does not use a more convenient UI.

Therefore, the information processing system includes an information processing device that determines a UI for controlling a control target device and controls notification of the determined UI to a user in accordance with a communication scheme between the control target device and the information processing device for controlling the control target device.

For example, the information processing system includes an information processing device 100 in addition to the remote controller 200, the display device 300A, and the AC device 300B as illustrated in FIG. 1. The information processing device 100 has a communication function and a notification function. Specifically, the information processing device 100 receives control information transmitted from the remote controller 200 and determines a UI on the basis of the received control information. Then, the information processing device 100 notifies the user of the determined UI.

When, for example, the information processing device 100 receives control information transmitted from the remote controller 200 to the display device 300A, in a case in which a voice input to the information processing device 100 is possible, the information processing device 100 determines voice input to the information processing device 100 as a UI. Then, the information processing device 100 provides voice notification of the fact that the user can use voice input to the information processing device 100 to control the display device 300A instead of the remote controller 200 to the user.

Then, the information processing device 100 controls the display device 300A on the basis of the voice of the user. For example, the information processing device 100 controls the display device 300A by transmitting control information specified by the voice of the user to the display device 300A instead of the remote controller 200.

As described above, the information processing system includes the information processing device 100 that determines a UI for controlling the control target device 300 and controls notification of the determined UI to a user in accordance with a communication scheme between the control target device 300 and the information processing device 100 for controlling the control target device 300. Thus, since the notification of the UI available for controlling the control target device 300 is provided to the user, the user can ascertain the UI that he or she has not recognized. Therefore, the user can select a suitable UI for him or her from among a plurality of UIs, and the user's convenience in controlling the control target device can be improved. The information processing system will be described in detail below. Note that, for the sake of convenience of description, information processing devices 100 according to first and second embodiments will be distinguished from each other by giving numbers corresponding to the embodiments to the ends, like an information processing device 100-1 and an information processing device 100-2.

2. First Embodiment (Notification of Control UI of Control Target Device)

A first embodiment of the present disclosure will be descried. In the first embodiment, the information processing device 100-1 notifies the user of a UI for controlling a control target device discovered on the basis of communication. Then, the information processing device 100-1 controls the control target device on the basis of information input through the UI.

2-1. Logical Configuration of System

Figure 2:
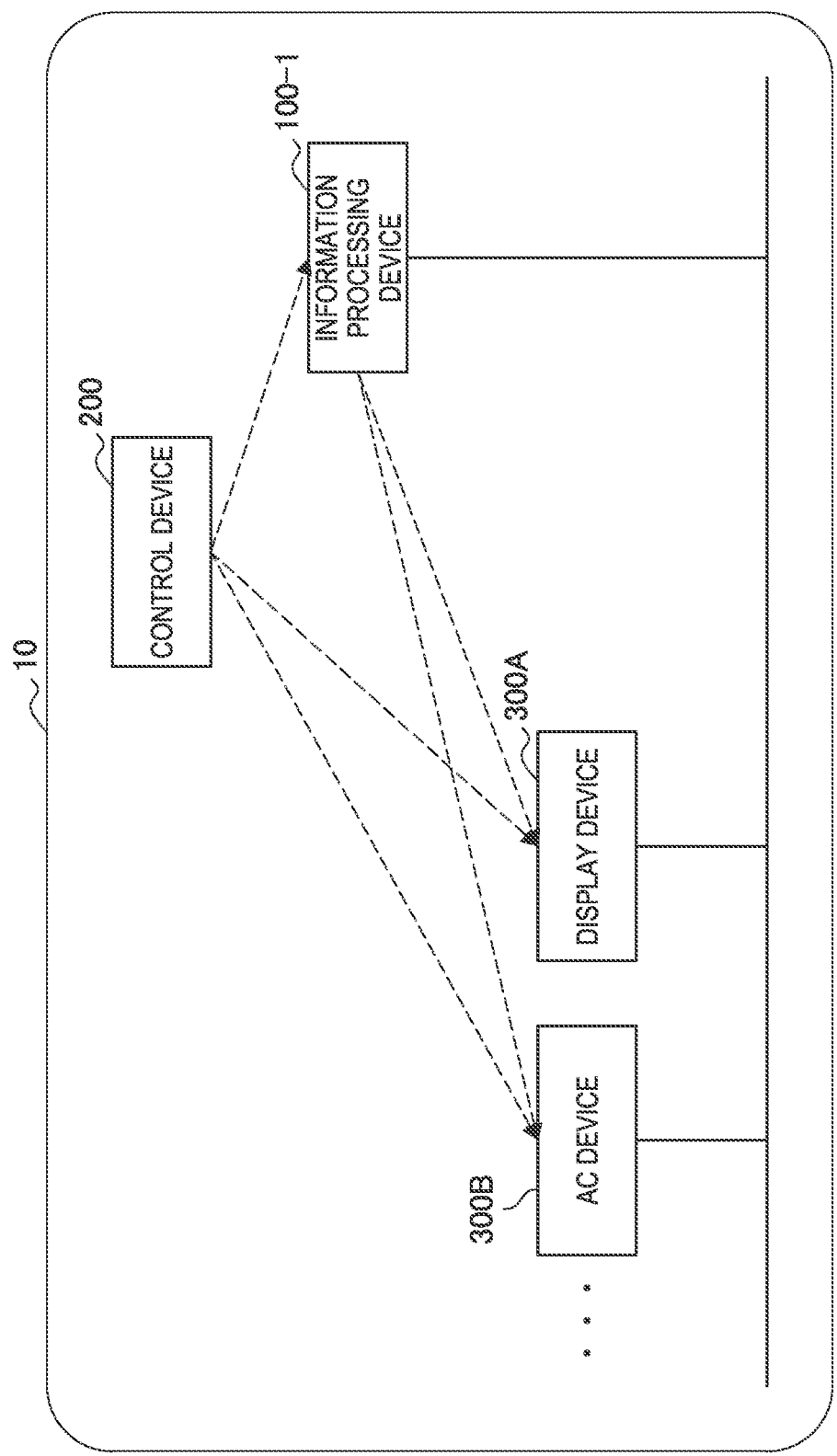
FIG. 2 is a diagram illustrating an example of a schematic logical configuration of an information processing system according to a first embodiment of the present disclosure.

A logical configuration of an information processing system according to a first embodiment of the present disclosure will be described with reference to FIG. 2. FIG. 2 is a diagram illustrating an example of a schematic logical configuration of an information processing system according to the present embodiment.

The information processing system includes the information processing device 100-1, the control device 200, the display device 300A, and the AC device 300B as illustrated in FIG. 2. In addition, the information processing device 100-1 and the control device 200 are connected to the control target devices 300 through communication of a first communication scheme, and the information processing device 100-1 and the control device 200 are also connected to each other through the communication of the first communication scheme. In addition, the information processing device 100-1 and the control target devices 300 are connected through communication of a second communication scheme. The first communication scheme is, for example, an infrared communication, and the second communication scheme is local area network (LAN). Note that these devices are assumed to be installed within one house 10.

The control device 200 controls the control target devices 300 on the basis of user operations. Specifically, the control device 200 controls the control target devices 300 by transmitting control information to the control target devices 300 on the basis of user operations. The control device 200 is, for example, a remote controller for controlling the control target devices 300, and transmits control information corresponding to the control details to the display device 300A or the AC device 300B using an infrared communication scheme when control details are input by a user. Note that the control device 200 may be a mobile communication terminal such as a smartphone.

The display device 300A displays an image on the basis of the control information. Specifically, the display device 300A receives the control information and performs a process of displaying an image specified from the received control information. The display device 300A receives the control information using, for example, the infrared communication scheme, and performs a process specified from the received control information, for example, activation, termination, change of displayed content, or the like.

The AC device 300B controls AC on the basis of the control information. Specifically, the AC device 300B receives the control information and performs an AC process specified from the received control information. The AC device 300B receives the control information using, for example, the infrared communication scheme and performs a process specified from the received control information, for example, activation, termination, change of setting of a target temperature, or the like.

Note that, although the display device 300A and the AC device 300B are exemplified as examples of the control target devices 300 in the above description, the control target devices 300 may be other home appliances installed in the house. The control target devices 300 may be, for example, a refrigerator, a washing machine, a lighting apparatus, a curtain, a window shade, a storm door, a window, a door, a ventilator, a cooking apparatus (a gas stove, a microwave, a coffee machine, or the like), a toilet apparatus (a toilet seat, a toilet bowl cleaning apparatus, or the like), or a bathroom apparatus (a water temperature controller, a bathroom drier, or the like) or the like.

The information processing device 100-1 will be described below in detail.

2-2. Physical Configuration of Device

Figure 3:
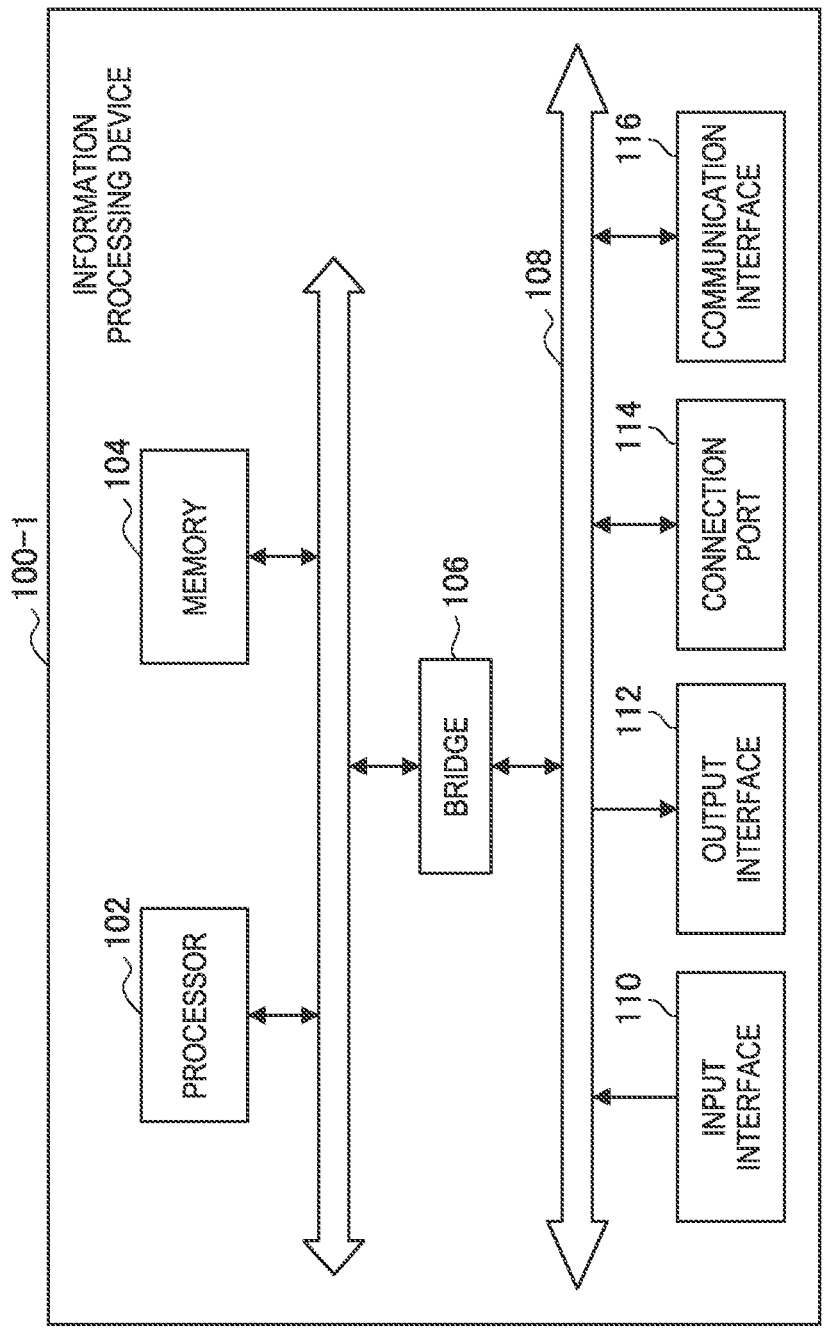
FIG. 3 is a diagram illustrating an example of a schematic physical configuration of an information processing device according to the embodiment.

Next, an example of a physical configuration of the information processing device 100-1 will be described with reference to FIG. 3. FIG. 3 is a diagram illustrating an example of a schematic physical configuration of the information processing device 100-1 according to the present embodiment.

The information processing device 100-1 includes a processor 102, a memory 104, a bridge 106, a bus 108, an input interface 110, an output interface 112, a connection port 114, and a communication interface 116 as illustrated in FIG. 3.

(Processor)

The processor 102 functions as an arithmetic processing device, and is a control module realizing functions of a control unit 124 and a voice processing unit 128 included in the information processing device 100-1, which will be described below, in cooperation with various programs. The processor 102 causes various logical functions of the information processing device 100-1, which will be described below, to operate by executing programs stored in the memory 104 or another storage medium using a control circuit. For example, the processor 102 can be a central processing unit (CPU), a graphics processing unit (GPU), a digital signal processor (DSP), or a System-on-a-Chip (SoC).

(Memory)

The memory 104 stores programs, arithmetic parameters and the like used by the processor 102. The memory 104 includes, for example, a random access memory (RAM), and temporarily stores programs used in execution of the processor 102, parameters that appropriately change in the execution, and the like. In addition, the memory 104 includes a read only memory (ROM), and realizes the function of a storage unit 126, which will be described below, with the RAM and the ROM. Note that an external storage device may be used as a part of the memory 104 via the connection port 114, the communication interface 116, or the like.

Note that the processor 102 and the memory 104 are connected to each other by an internal bus such as a CPU bus or the like.

(Bridge and Bus)

The bridge 106 connects the buses. Specifically, the bridge 106 connects the internal bus connecting the processor 102 and the memory 104 and the bus 108 connecting the input interface 110, the output interface 112, the connection port 114, and the communication interface 116.

(Input Interface)

The input interface 110 is used by a user to operate the information processing device 100-1 or input information to the information processing device 100-1, and realizes a function of a voice input unit 132. The input interface 110 includes, for example, a button for activating the information processing device 100-1, an input means for the user to input information such as a voice input, an input control circuit that generates an input signal on the basis of an input by the user and outputs the signal to the processor 102, or the like. Note that the input means may be a mouse, a keyboard, a touch panel, a switch, a lever, a microphone, or the like. The user of the information processing device 100-1 can input various kinds of data or instruct processing operations to the information processing device 100-1 by operating the input interface 110.

(Output Interface)

The output interface 112 is used to provide a notification of information of the user, and realizes a function of a voice output unit 130, which will be described below. The output interface 112 may be a device such as a liquid crystal display (LCD) device, an organic light emitting diode (OLED) device, a projector, a speaker, a headphone, or the like, or may be a module that performs output to the device.

(Connection Port)

The connection port 114 is a port for connecting an apparatus directly to the information processing device 100-1. The connection port 114 can be, for example, a universal serial bus (USB) port, an IEEE 1394 port, a small computer system interface (SCSI) port, or the like. In addition, the connection port 114 may be an RS-232C port, an optical audio terminal, a high-definition multimedia interface (HDMI; registered trademark) port, or the like. Data can be exchanged between the information processing device 100-1 and an external apparatus by connecting the external apparatus to the connection port 114.

(Communication Interface)

The communication interface 116 intermediates communication between the information processing device 100-1 and an external device, and realizes functions of an infrared communication unit 120 and a LAN communication unit 122, which will be described below. The communication interface 116 executes communication in accordance with, for example, an infrared communication scheme or a LAN communication scheme. Note that the communication interface 116 may execute wireless communication in accordance with any wireless communication scheme such as a short-range wireless communication scheme including Bluetooth (registered trademark), Near Field Communication (NFC), a wireless USB, TransferJet (registered trademark), or the like, a cellular communication scheme including Wideband Code Division Multiple Access (WCDMA), WiMAX (registered trademark), Long Term Evolution (LTE), LTE-A, or the like, a wireless local area network (LAN) including Wi-Fi (registered trademark), or the like. In addition, the communication interface 116 may execute wired communication including signal line communication, wired LAN communication, or the like.

2-3. Logical Configuration of Device

Figure 4:
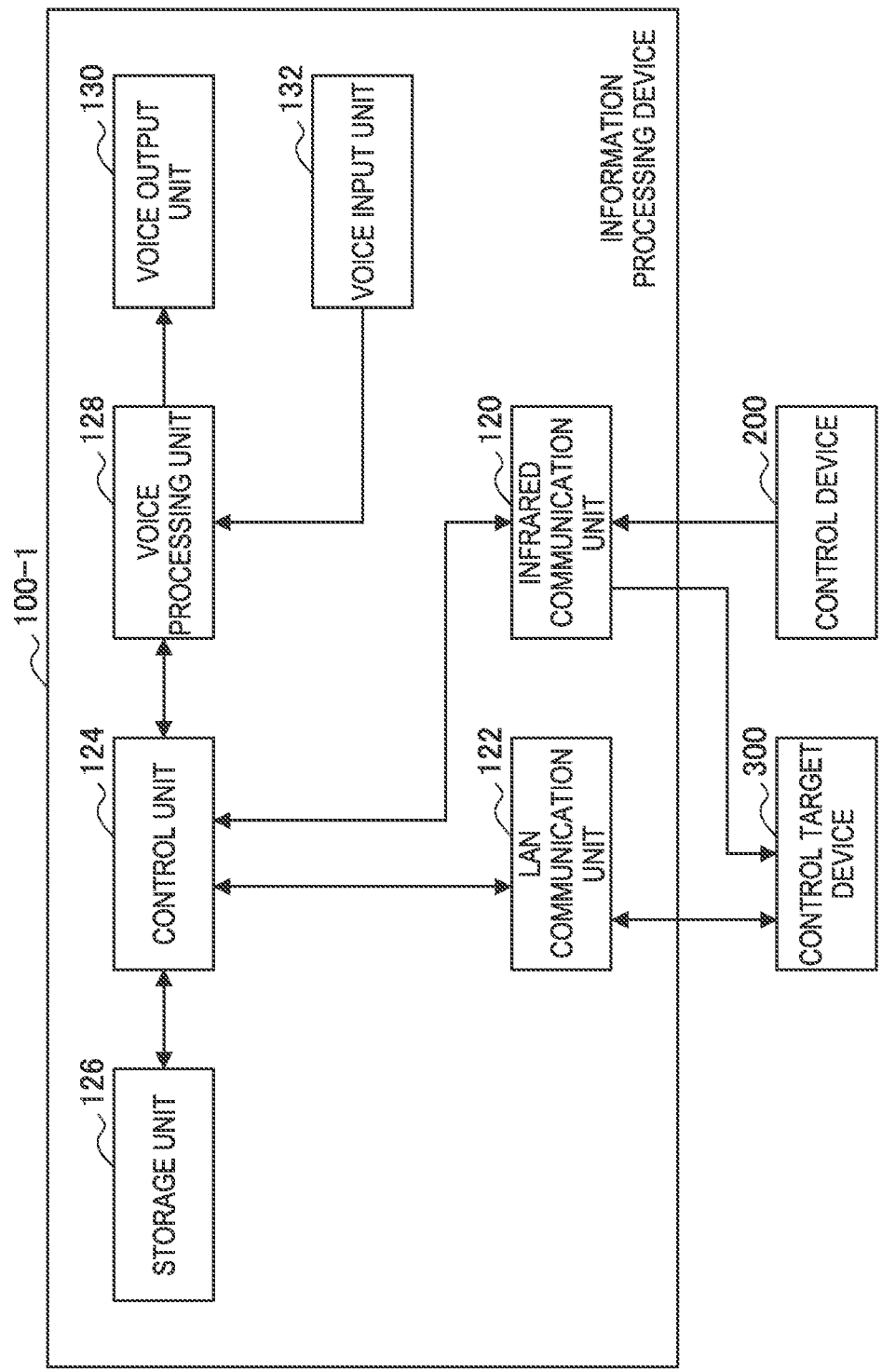
FIG. 4 is a diagram illustrating an example of a schematic logical configuration of the information processing device according to the embodiment.

Next, an example of a logical configuration of the information processing device 100-1 according to the present embodiment will be described with reference to FIG. 4. FIG. 4 is a diagram illustrating an example of a schematic logical configuration of the information processing device 100-1 according to the present embodiment.

The information processing device 100-1 includes the infrared communication unit 120, the LAN communication unit 122, the control unit 124, the storage unit 126, the voice processing unit 128, the voice output unit 130, and the voice input unit 132 as illustrated in FIG. 4.

(Infrared Communication Unit)

The infrared communication unit 120 communicates with an external device using an infrared communication scheme. Specifically, the infrared communication unit 120 receives control information transmitted in the infrared communication scheme from the control device 200, and transmits the control information to the control target devices 300 in the infrared communication scheme. The infrared communication unit 120 analyzes, for example, a received infrared signal in accordance with a format and acquires control information through infrared communication (which will also be referred to as infrared communication control information). The infrared communication control information is, for example, an infrared communication control code. In addition, the format is stored in the storage unit 126 in advance. Note that the received infrared signal may be an infrared signal transmitted to a device other than the information processing device 100-1. The infrared communication unit 120 receives, for example, an infrared signal transmitted from the control device 200 to the control target devices 300.

Here, since formats of an infrared signal may be individually defined by manufacturers of control target devices, products, and the like, it is difficult to store all formats in the storage unit 126 in advance. For this reason, it is not possible to precisely analyze all details of the infrared signal, and for example, it may be difficult to specify specific control content for control target device using an infrared signal. Meanwhile, since the formats of the infrared signal are mostly similar, it is possible to discriminate whether a corresponding infrared signal is a signal for controlling a control target device (a control signal).

Thus, in a case in which a received infrared signal is in a known format, the infrared communication unit 120 acquires infrared communication control information from the received infrared signal. In addition, in a case in which the received infrared signal is in an unknown format, when the received infrared signal is discriminated as a control signal, the infrared communication unit 120 acquires the signal pattern of the received infrared signal as infrared communication control information. Note that the control unit 124 causes the storage unit 126 to store the acquired infrared communication control information.

Note that in a case in which the received infrared signal is in an unknown format, infrared communication control information may be acquired through learning of a relationship between the signal pattern and control of a control target device.

(LAN Communication Unit)

The LAN communication unit 122 communicates with an external device in a LAN communication scheme. Specifically, the LAN communication unit 122 communicates information by which a control target device 300 is identified (which will also be referred to as identification information) and control information of LAN communication (which will also be referred to as LAN communication control information) in the LAN communication scheme. When the information processing device 100-1 is connected to a LAN, for example, the LAN communication unit 122 receives identification information from a control target device 300 connected to the LAN. In addition, the LAN communication unit 122 transmits LAN communication control information to the control target device 300. The LAN communication control information is, for example, information regarding an input using a control application for controlling the control target device 300 (which will also be referred to as application input information) through LAN communication. In addition, the LAN communication control information may be application programming interface (API) information by which the control target device 300 can be controlled through LAN communication. Note that the LAN communication unit 122 may transmit a signal requiring identification information from the control target device 300. In addition, the LAN communication unit 122 may perform inter-device direct communication such as Zigbee (registered trademark) or Wi-Fi Direct (registered trademark), instead of wired LAN communication or wireless LAN communication.

(Control Unit)

The control unit 124 mainly has a function of determining a UI, a function of controlling notification of a UI, and a function of controlling a control target device 300 in accordance of an input using a UI.

First, the function of determining a UI will be described. The control unit 124 determines, as a determination unit, a UI for controlling a control target device 300 in accordance with a communication scheme used between the control target device 300 and the information processing device 100-1 for controlling the control target device 300. Specifically, the control unit 124 determines a UI in accordance with a communication scheme specified on the basis of reception of first control information for controlling the control target device 300 transmitted from the control device 200. More specifically, the control unit 124 determines a first UI that is compatible with the first communication scheme used in reception of the first control information. For example, in a case in which infrared communication control information serving as first control information is received by the infrared communication unit 120 or the LAN communication unit 122, the control unit 124 determines a UI in accordance with the fact whether the information processing device 100-1 has an infrared transmission function. Specifically, in a case in which the information processing device 100-1 has the infrared transmission function, the control unit 124 determines a voice input as the first UI.

In addition, the control unit 124 determines a second UI that is compatible with a second communication scheme for controlling the control target device 300, which uses a control application of the control target device 300 or second control information for controlling the control target device 300 specified on the basis of the received first control information. For example, in a case in which infrared communication control information serving as first control information has information corresponding to identification information, which will be described below, the control unit 124 specifies information regarding the control target device 300 (which will also be referred to as device information) from the storage unit 126 on the basis of the information corresponding to the identification information. Then, the control unit 124 specifies the control application for controlling the control target device 300 or API information serving as the second control information via LAN communication associated with the specified device information. Then, when the control application or API information is specified, the control unit 124 determines the control application of the control target device 300 as the second UI. Note that, in a case in which the API information is specified, a voice input may be additionally determined as the second UI. In addition, the control application may be a specific application dedicated to the specific control target device 300 or a versatile application.

On the other hand, the control unit 124 determines a UI in accordance with a communication scheme specified on the basis of identification information received from the control target device 300. Specifically, the control unit 124 determines a first UI that is compatible with the first communication scheme that uses first control information specified on the basis of the received identification information. When the identification information is received by the LAN communication unit 122, for example, the control unit 124 specifies infrared communication control information from the storage unit 126 on the basis of the received identification information. Then, when the infrared communication control information is specified, the control unit 124 determines a voice input as the first UI.

In addition, the control unit 124 determines the second UI that is compatible with the second communication scheme that uses the control application or the second control information specified on the basis of the received identification information. When the identification information is received by the LAN communication unit 122, for example, the control unit 124 specifies the control application or API information from the storage unit 126 on the basis of the received identification information. Then, when the control application or the API information is specified, the control unit 124 determines the control application of the control target device 300 as the second UI. In addition, in a case in which the API information is specified, the control unit 124 may additionally determine a voice input as the second UI.

Next, the function of controlling notification of a UI will be described. The control unit 124 controls, as a notification control unit, notification of a determined UI to a user. Specifically, the control unit 124 causes the voice output unit 130 to output a notification of a determined UI using sound to a user. The notification to a user by using sound is, for example, reading of a message, or the like. When the UI, of which the user is to be notified of, is determined, the control unit 124 generates a message relating to the notification of the UI and causes the voice processing unit 128 to convert the generated message into a voice signal. Then, the voice output unit 130 outputs a voice to provide a notification of the UI on the basis of the converted voice signal.

Note that the notification of the determined UI to the user may be a notification using display. For example, the control unit 124 may cause a display unit, which is separately provided in the information processing device 100-1 or connected to the information processing device 100-1, to output an image illustrating the determined UI.

Next, the function of controlling a control target device 300 in accordance with an input using a UI will be described. The control unit 124 controls, as a device control unit, a control target device 300 on the basis of an input using a UI that has been notified of. Specifically, the control unit 124 specifies control information on the basis of information input via a UI, of which the user has been notified of. Next, using a communication scheme corresponding to the specified control information, the control unit 124 causes a corresponding communication unit to transmit the control information.

In a case in which the provided UI is a voice input, for example, a control instruction using the user's voice is converted into control instruction information through the voice input unit 132 and the voice processing unit 128. When the control instruction information is provided by the voice processing unit 128, the control unit 124 specifies an infrared communication control code or API information corresponding to the control instruction information to be stored in the storage unit 126 on the basis of the control instruction information. In addition, in a case in which the infrared communication control code is specified, the control unit 124 causes the infrared communication unit 120 to transmit the infrared communication control code, and in a case in which the API information is specified, the control unit 124 causes the LAN communication unit 122 to transmit the API information.

In a case in which the provided UI is a control application, for example, application input information is generated in the control application on the basis of an operation of the control application by a user. When the application input information is provided from the control application, the control unit 124 causes the LAN communication unit 122 to transmit the application input information. Note that, in the control application, API information corresponding to an operation of the control application by the user may be generated. In addition, the control unit 124 may specify the API information on the basis of information output from the control application. In this case, the control unit 124 causes the LAN communication unit 122 to transmit the API information provided from the control application.

Further, the above-described functions of determining a UI, providing a notification of a UI, and controlling a control target device 300 in accordance with an input using a UI will be described in detail with reference to FIG. 5 to FIG. 8. FIG. 5 to FIG. 8 are diagrams for describing processing examples of the information processing device 100-1 according to the present embodiment.

Figure 5:
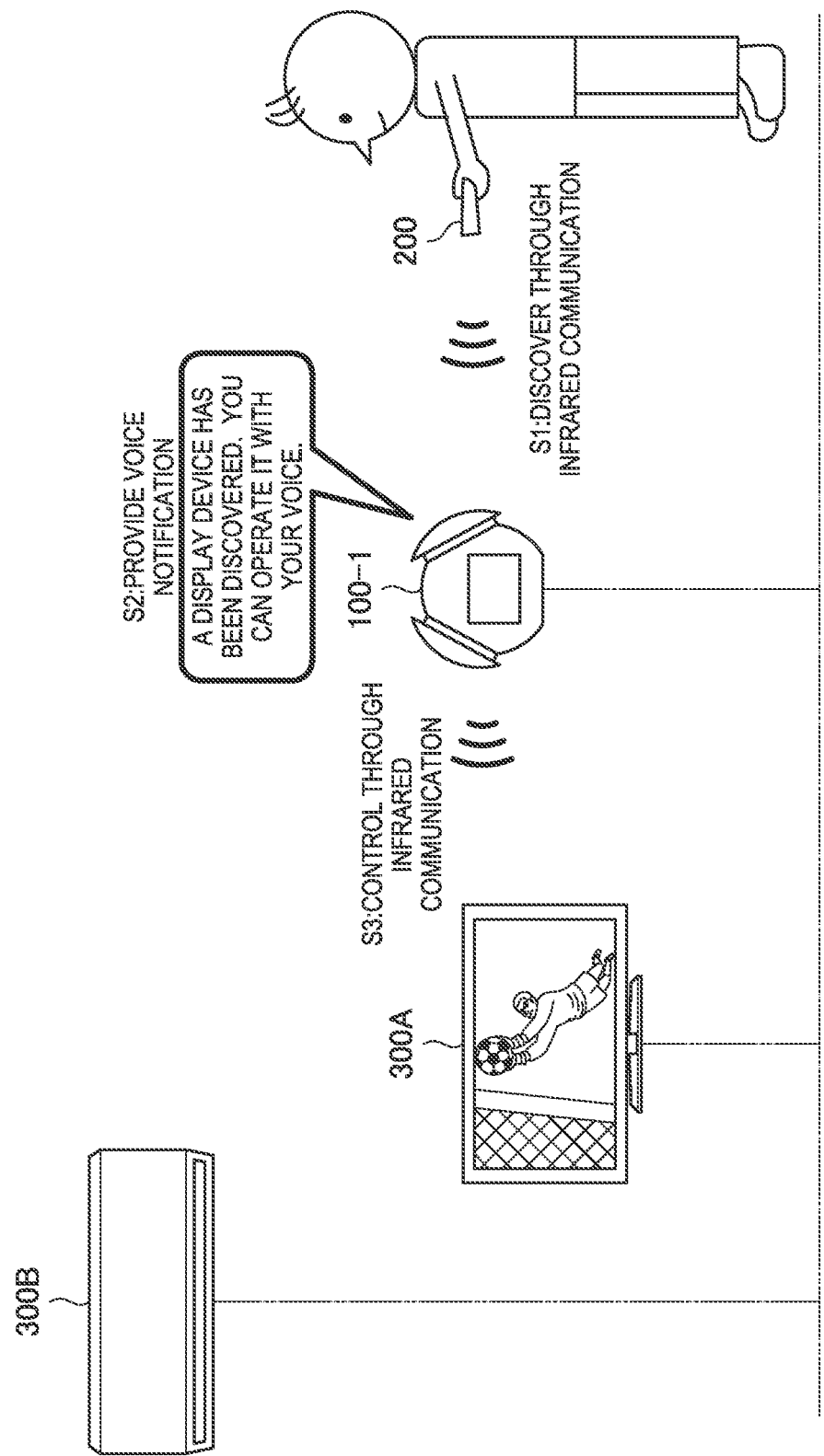
FIG. 5 is a diagram for describing a processing example of the information processing device according to the embodiment.

First, a case in which a control target device 300 that is a control target is discovered by receiving control information from the control device 200 using an infrared communication scheme and the control target device 300 is controlled by using the infrared communication scheme will be described with reference to FIG. 5.

When the infrared communication unit 120 receives infrared communication control information from the control device 200, the control unit 124 specifies device information of the control target device 300 on the basis of the infrared communication control information (Step S1). For example, infrared communication control code for activating the display device 300A is transmitted from the control device 200 as illustrated in FIG. 5. When the infrared communication unit 120 receives the infrared communication control code, the control unit 124 specifies device information of the control target device 300 from the infrared communication control code to be stored in the storage unit 126.

In addition, when the infrared communication control information is received, the control unit 124 causes the voice output unit 130 to provide a notification of a UI that is determined on the basis of whether the information processing device 100-1 has the infrared transmission function (Step S2). For example, the control unit 124 determines whether the infrared communication unit 120 has a transmission function. In a case in which it is determined that the infrared communication unit 120 has the transmission function, the control unit 124 determines a voice input that is compatible with the infrared communication scheme as a UI. Then, the control unit 124 causes the voice output unit 130 to provide a notification of the determined UI to the user. In detail, the control unit 124 causes the voice output unit 130 to output a message as illustrated in FIG. 5 for providing a notification of the fact that the display device 300A has been specified and the voice input is available as a UI for controlling the display device 300A.

Then, when an input using the UI that has been notified of is performed, the control unit 124 specifies infrared communication control information on the basis of the input and causes the infrared communication unit 120 to transmit the specified infrared communication control information (Step S3). For example, when the user instructs control of the control target device 300 using a voice input, the control unit 124 acquires control instruction information through the voice input unit 132 and the voice processing unit 128. When the control instruction information is acquired, the control unit 124 specifies an infrared communication control code specified from the control instruction information. Then, the control unit 124 causes the infrared communication unit 120 to transmit the specified infrared communication control code.

Figure 6:
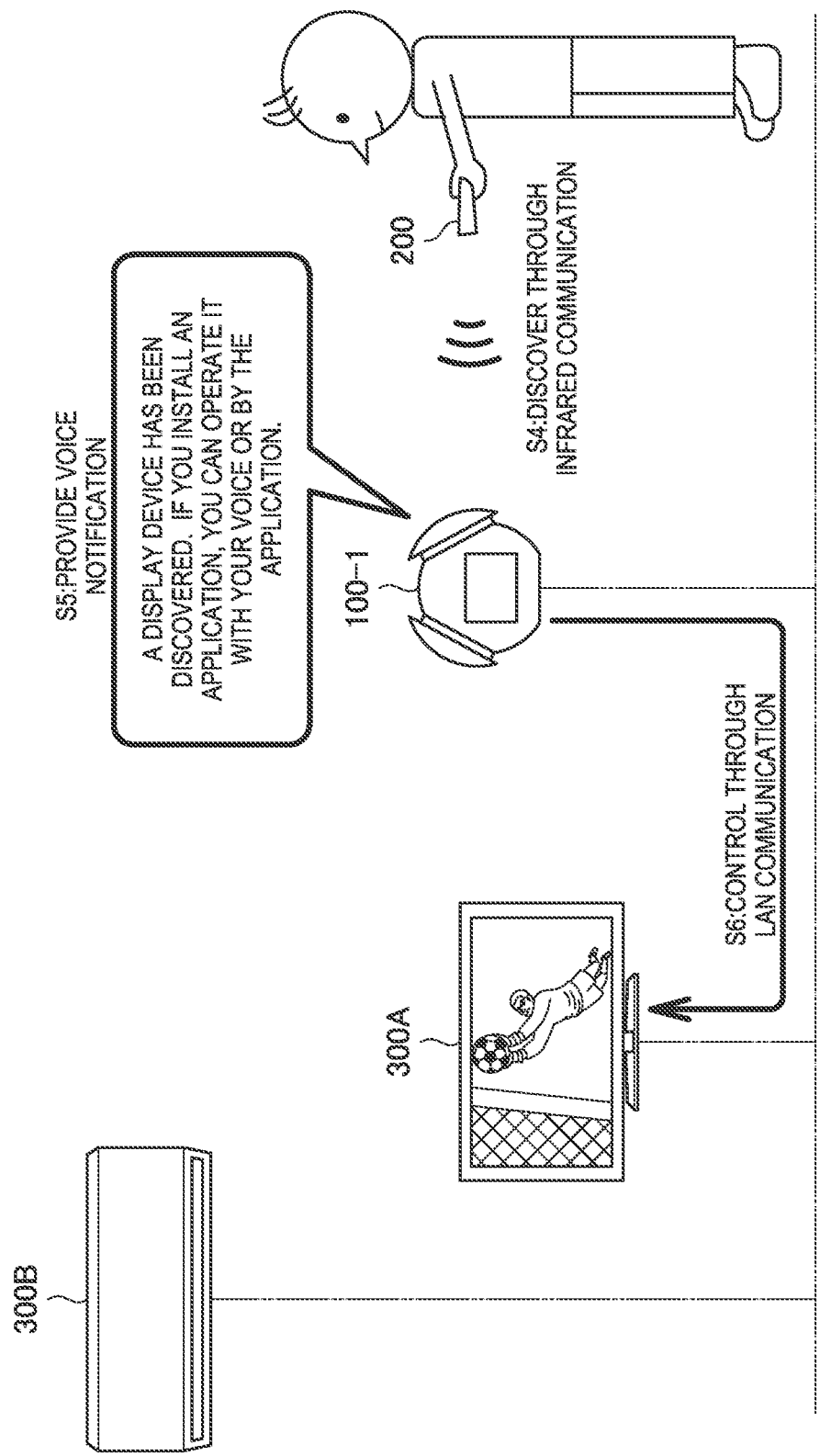
FIG. 6 is a diagram for describing a processing example of the information processing device according to the embodiment.

Next, a case in which the control target device 300 that is a control target is discovered by receiving control information using the infrared communication scheme from the control device 200 and the control target device 300 is controlled using the LAN communication scheme will be described with reference to FIG. 6. Note that description of substantially the same process as the above-described process will be omitted.

When the infrared communication unit 120 receives infrared communication control information from the control device 200, the control unit 124 specifies device information of the control target device 300 on the basis of the infrared communication control information (Step S4).

In a case in which a control application or API information is specified from the specified device information, the control unit 124 causes the voice output unit 130 to provide a notification of a UI that is compatible with the LAN communication scheme (Step S5). For example, in a case in which the specified device information of the display device 300A includes information representing the presence of the control application (which will also be referred to as control application information below) or in a case in which the API information corresponding to an infrared communication control code is specified, the control unit 124 specifies the control application as a UI. Then, the control unit 124 causes the voice output unit 130 to provide a notification of the determined UI to the user. In detail, the control unit 124 causes the voice output unit 130 to output a message as illustrated in FIG. 6 for providing a notification of the fact that the display device 300A has been specified and the control application is available as a UI for controlling the display device 300A. Note that, in a case in which the API information is specified, a notification of the fact that a voice input is also available may be provided as well.

Thereafter, when an input using the control application that has been notified of is performed, the control unit 124 causes the LAN communication unit 122 to transmit information generated on the basis of the input (Step S6). For example, when the user instructs control of the control target device 300 using the control application, the control unit 124 acquires application input information generated by the control application or the API information. When the application input information from the control application or the API information is acquired, the control unit 124 causes the LAN communication unit 122 to transmit the application input information or the API information.

Figure 7:
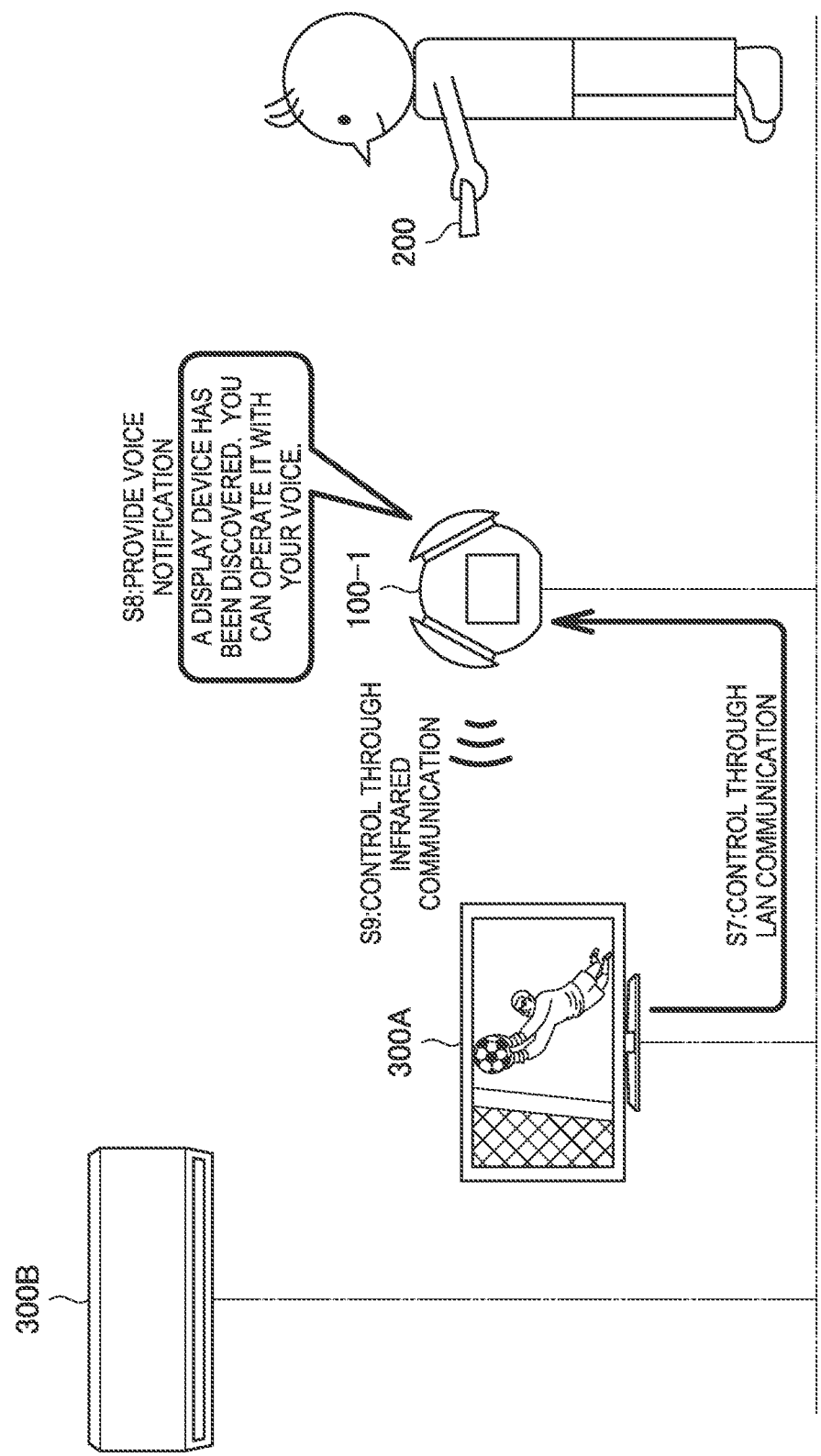
FIG. 7 is a diagram for describing a processing example of the information processing device according to the embodiment.

Next, a case in which the control target device 300 that is a control target is discovered by receiving identification information using the LAN communication scheme from the control target device 300 and the control target device 300 is controlled using the infrared communication scheme will be described with reference to FIG. 7. Note that description of substantially the same process as the above-described process will be omitted.

When the LAN communication unit 122 receives identification information from the control target device 300, the control unit 124 specifies the device information of the control target device 300 on the basis of the identification information (Step S7). For example, when the identification information is transmitted from the display device 300A connected on the LAN as illustrated in FIG. 7 and the identification information is received by the LAN communication unit 122, the control unit 124 specifies the device information of the display device 300A to be stored in the storage unit 126 from the identification information.

In a case in which the infrared communication control information is acquired from the specified device information, the control unit 124 causes the voice output unit 130 to provide a notification of a UI that is compatible with the infrared communication scheme (Step S8). For example, when the infrared communication unit 120 has a transmission function in a case in which the specified device information of the display device 300A includes an infrared communication control code, the control unit 124 determines a voice input as a UI. Then, the control unit 124 causes the voice output unit 130 to provide a notification of the determined UI to the user. In detail, the control unit 124 causes the voice output unit 130 to output a message as illustrated in FIG. 7 for providing a notification of the fact that the display device 300A has been specified and the voice input is available as a UI for controlling the display device 300A.

Thereafter, when an input using the UI that has been notified of is performed, the control unit 124 specifies infrared communication control information on the basis of the input and causes the infrared communication unit 120 to transmit the specified infrared communication control information (Step S9).

Figure 8:
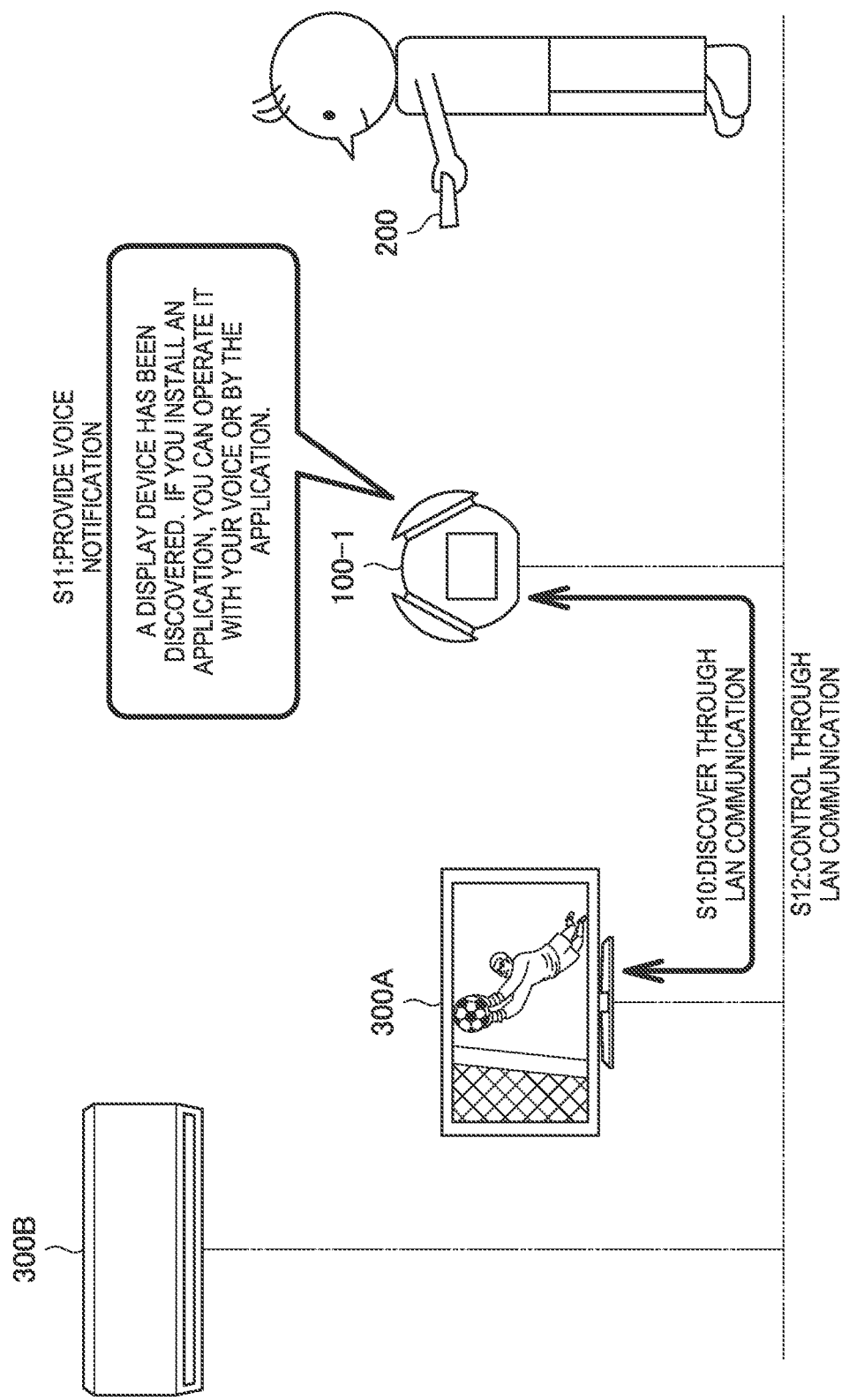
FIG. 8 is a diagram for describing a processing example of the information processing device according to the embodiment.

Next, a case in which the control target device 300 that is a control target is discovered by receiving identification information using the LAN communication scheme from the control target device 300 and the control target device 300 is controlled using the LAN communication scheme will be described with reference to FIG. 8. Note that description of substantially the same process as the above-described process will be omitted.

When the LAN communication unit 122 receives the identification information from the control target device 300, the control unit 124 specifies the device information of the control target device 300 on the basis of the identification information (Step S10).

In a case in which the control application or the API information is specified from the specified device information, the control unit 124 causes the voice output unit 130 to provide a notification of a UI that is compatible with the LAN communication scheme (Step S11).

Thereafter, when an input using the control application that has been notified of is performed, the control unit 124 causes the LAN communication unit 122 to transmit information generated on the basis of the input (Step S12).

(Storage Unit)

The storage unit 126 stores information to be used in processes of the information processing device 100-1. Specifically, the storage unit 126 stores information regarding an infrared communication process, information regarding a UI determination process, information regarding a control process for the control target device 300, and the like. For example, the storage unit 126 stores an infrared signal format, device information, a list of infrared communication control codes, a received infrared communication control code, control application information, and a list of API information. Note that the above-described information may be acquired from an external storage device via communication, instead of the storage unit 126.

(Voice Processing Unit)

The voice processing unit 128 performs generation and analysis of voice information. Specifically, the voice processing unit 128 generates voice information regarding voice notification instructed by the control unit 124 and provides the generated voice information to the voice output unit 130. In addition, the voice processing unit 128 analyzes voice information provided by the voice input unit 132 and converts the information into textual information or the like on the basis of the analysis result. For example, the voice processing unit 128 converts a message provided by the control unit 124 into voice information and provides the converted voice information to the voice output unit 130. In addition, the voice processing unit 128 converts the voice information provided by the voice input unit 132 into textual information using a so-called sound recognition technology. Then, the voice processing unit 128 provides the converted textual information to the control unit 124 as control instruction information.

Note that the voice processing unit 128 may perform an interaction process. In other words, the voice processing unit 128 may perform a process as a so-called voice agent. Specifically, the voice processing unit 128 converts voice information provided by the voice input unit 132 into textual information or the like and generates voice information corresponding to the aforementioned voice information on the basis of the textual information obtained through the conversion. Then, the voice processing unit 128 provides the generated voice information to the voice output unit 130. For example, in a case in which the textual information obtained by converting the input voice information represents a question, the voice processing unit 128 generates textual information having content responding to the question, and converts the generated textual information into voice information. Then, the voice processing unit 128 provides the converted textual information to the voice output unit 130 as control instruction information.

(Voice Output Unit)

The voice output unit 130 outputs a voice on the basis of voice information. Specifically, the voice output unit 130 outputs a voice on the basis of voice information provided by the voice processing unit 128. Note that the voice output unit 130 may output sound other than a voice.

(Voice Input Unit)

The voice input unit 132 acquires voice information regarding a voice around the information processing device 100-1. Specifically, the voice input unit 132 generates voice information in accordance with a voice of the user around the information processing device 100-1. Note that the voice input unit 132 may generate voice information in accordance with sound other than a voice. In addition, the voice input unit 132 may perform a process of inputting the voice of the user more clearly than other sound, for example, a so-called noise canceling process, or the like.

2-4. Process of Device

Next, processes of the information processing device 100-1 according to the present embodiment will be described.

Figure 9:
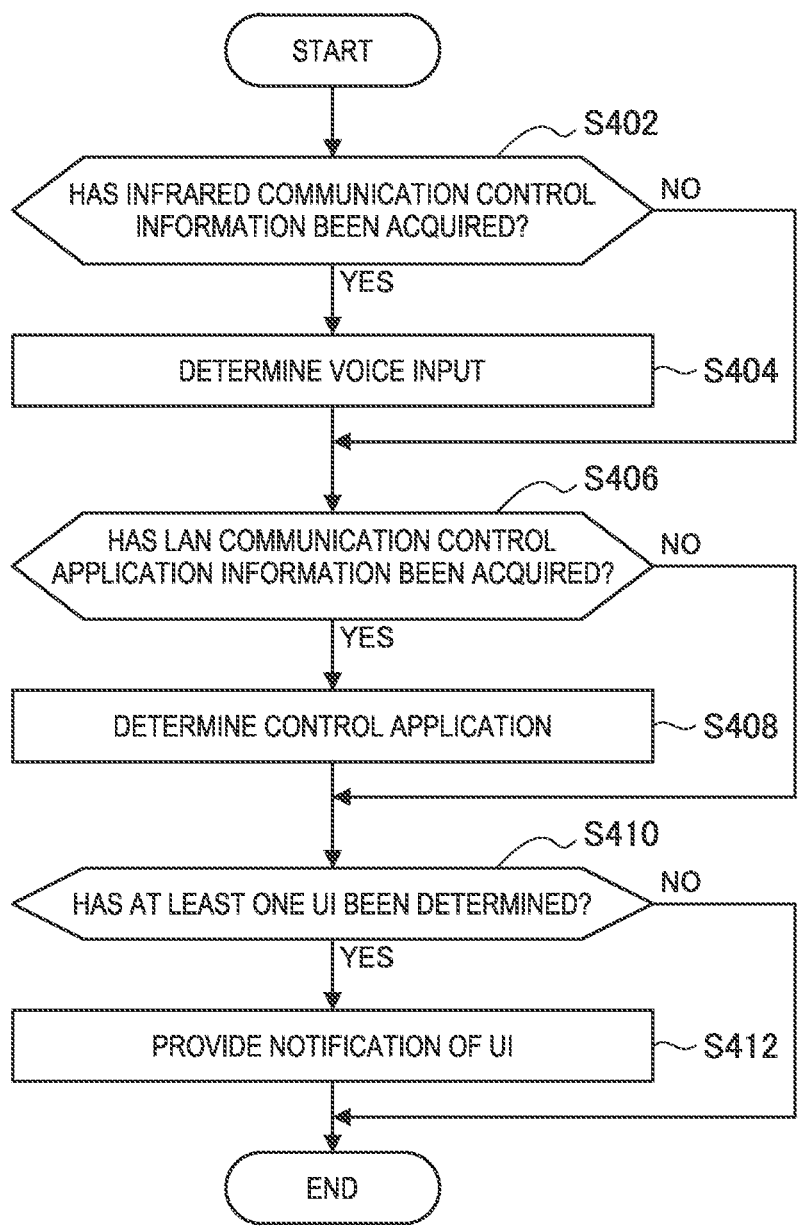
FIG. 9 is a flowchart conceptually illustrating a UI determination process and a UI notification process of the information processing device according to the embodiment.

First, a UI determination process and a UI notification process of the information processing device 100-1 will be described with reference to FIG. 9. FIG. 9 is a flowchart conceptually illustrating the UI determination process and the UI notification process of the information processing device 100-1 according to the present embodiment.

The information processing device 100-1 determines whether infrared communication control information has been acquired (Step S402). Specifically, the control unit 124 determines whether an infrared communication control code has been received by the infrared communication unit 120. In addition, the control unit 124 may determine whether an infrared communication control code has been acquired on the basis of identification information received by the LAN communication unit 122.

When the infrared communication control information is acquired, the information processing device 100-1 determines a voice input as a UI (Step S404). Specifically, when the infrared communication control code is acquired, the control unit 124 determines a voice input as a UI in a case in which the infrared communication unit 120 has a transmission function.

In addition, information processing device 100-1 determines whether LAN communication control application information or API information has been acquired (Step S406). Specifically, the control unit 124 determines whether the LAN communication control application information or the API information has been acquired on the basis of the identification information received by the LAN communication unit 122. Note that the control unit 124 may determine whether the control application information or the API information has been acquired on the basis of the infrared communication control information received by the infrared communication unit 120.

When the LAN communication control application information or the API information is acquired, the information processing device 100-1 determines a control application as a UI (Step S408). Specifically, when the LAN communication control application information or the API information is acquired, the control unit 124 determines the control application as a UI.

Next, the information processing device 100-1 determines whether at least one UI has been determined (Step S410). Specifically, the control unit 124 determines whether at least one of the voice input and the control application has been determined as a UI.

In a case in which at least one UI is determined, the information processing device 100-1 notifies the user of the determined UI (Step S412). Specifically, the control unit 124 generates a message for providing a notification of all determined UIs to the user and provides the generated message to the voice processing unit 128. The voice processing unit 128 converts the provided message into voice information and provides the converted voice information to the voice output unit 130. Then, a voice is output by the voice output unit 130 on the basis of the voice information. Note that notifications of only some UIs among the plurality of UIs may be provided. A UI, a notification of which is to be provided, may be selected on the basis of, for example, priority of the UIs.

Figure 10:
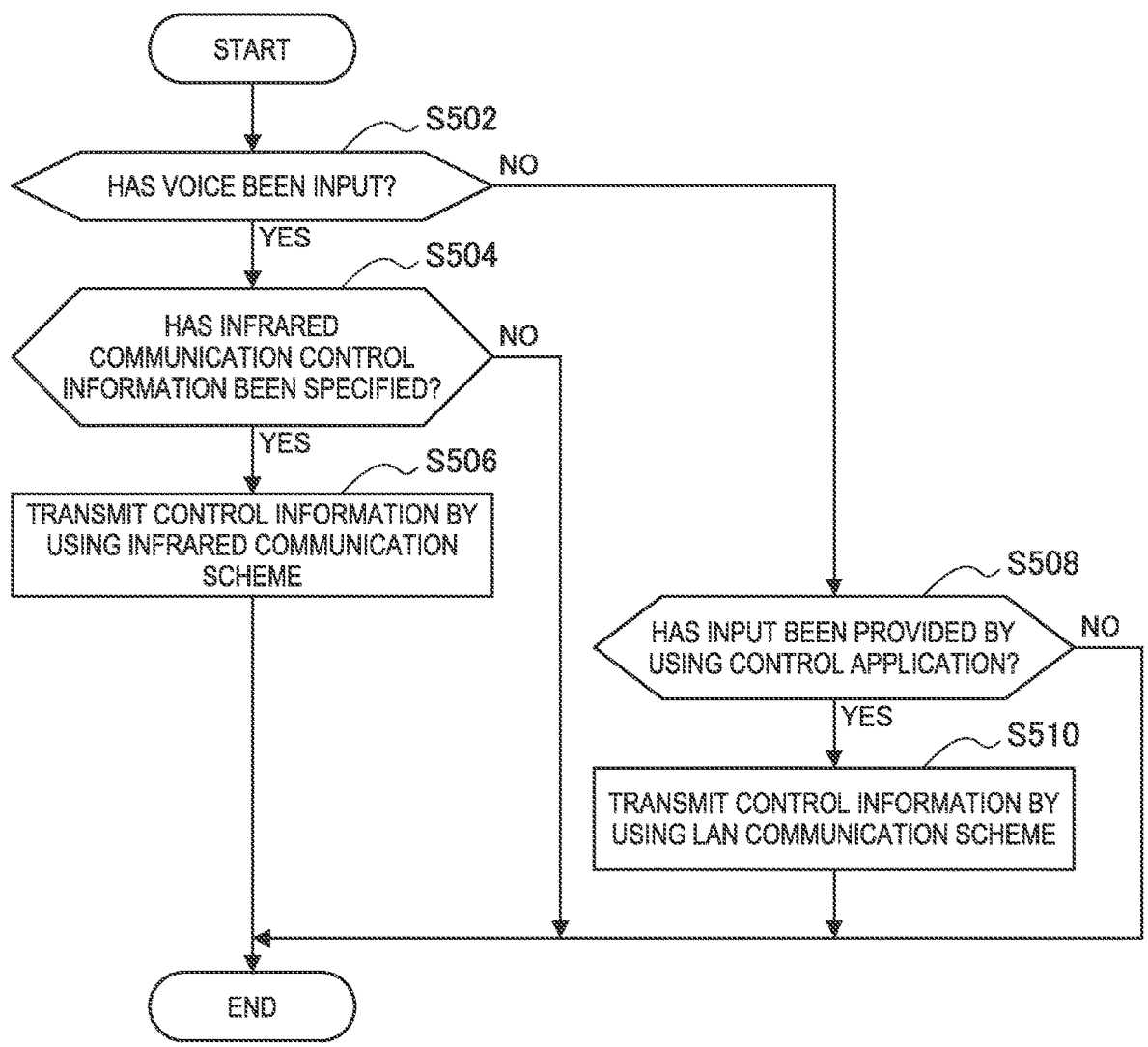
FIG. 10 is a flowchart conceptually illustrating a control process for a control target device by the information processing device according to the embodiment in accordance with an input using a UI.

Next, the control process for the control target device 300 by the information processing device 100-1 in accordance with an input using a UI will be described with reference to FIG. 10. FIG. 10 is a flowchart conceptually illustrating the control process for the control target device 300 by the information processing device 100-1 according to the present embodiment in accordance with an input using a UI.

The information processing device 100-1 determines whether there is a voice input (Step S502). Specifically, the control unit 124 determines whether control instruction information has been acquired from the voice processing unit 128.

When it is determined that the voice input has been performed, the information processing device 100-1 determines whether the infrared communication control information has been specified on the basis of the voice input (Step S504). Specifically, when the control instruction information is provided, the control unit 124 specifies the infrared communication control information corresponding to the control instruction information.

When it is determined that the infrared communication control information has been specified, the information processing device 100-1 transmits the infrared communication control information to the control target device 300 using the infrared communication scheme (Step S506). Specifically, when an infrared communication control code is specified, the control unit 124 causes the infrared communication unit 120 to transmit the infrared communication control code.

In addition, in a case in which it is determined that no voice input has been performed in Step S502, the information processing device 100-1 determines whether an input using a control application has been performed (Step S508). Specifically, when an input to the control application installed in the information processing device 100-1 is performed, the control application generates application input information or API information. Then, the control unit 124 determines whether the application input information or the API information has been provided from the control application.

When it is determined that an input using the control application has been performed, the information processing device 100-1 transmits the control information to the control target device 300 using the LAN communication scheme (Step S510). Specifically, when the application input information or the API information is provided from the control application, the control unit 124 causes the LAN communication unit 122 to transmit the application input information or the API information to the control target device 300.

2-5. Application Examples

Figure 11:
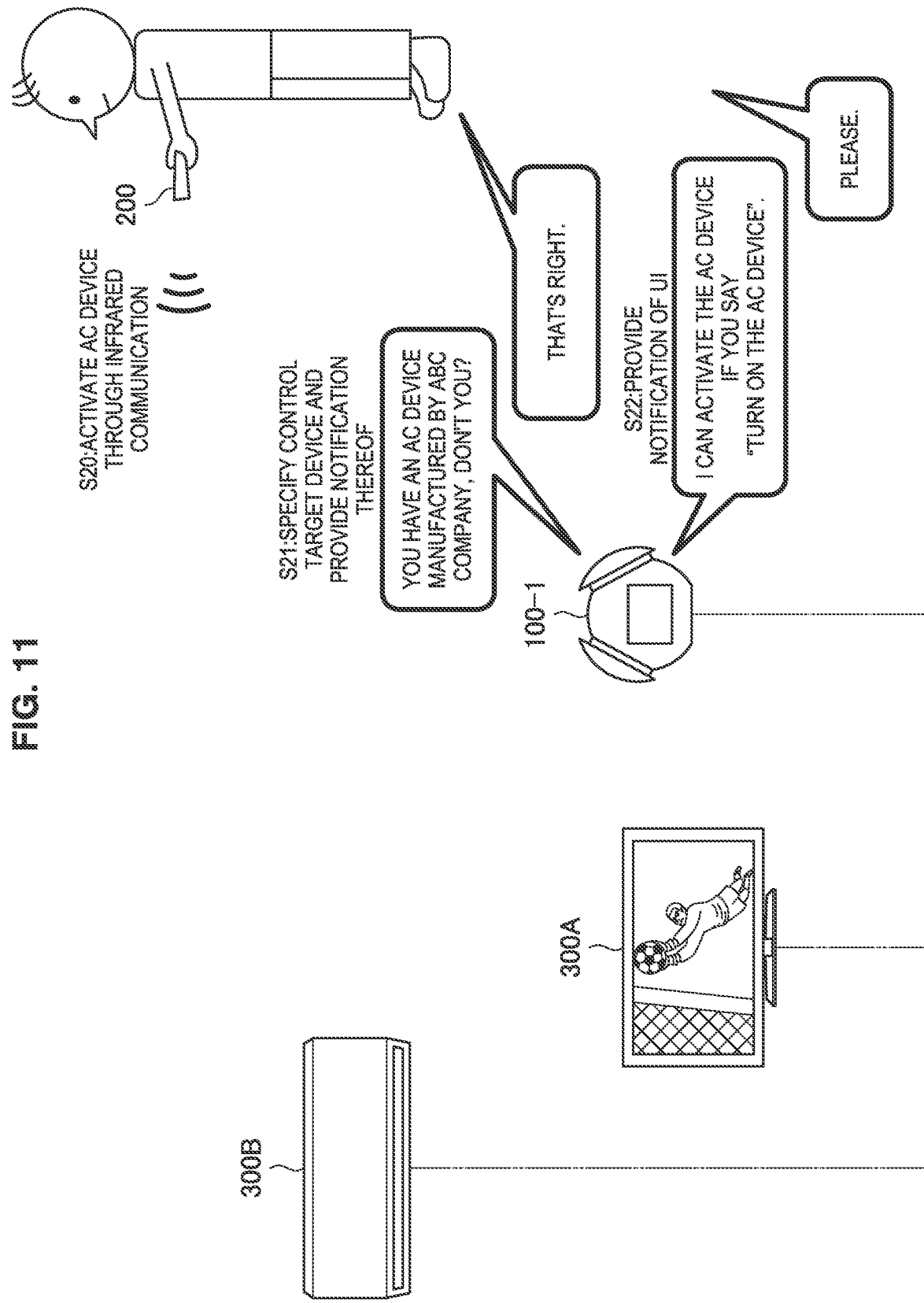
FIG. 11 is a diagram for describing an application example of the information processing system according to the embodiment.

The configurations and processes of the information processing device 100-1 have been described above. Next, application examples of the information processing system including the information processing device 100-1 will be described with reference to FIG. 11. FIG. 11 is a diagram for describing an application example of the information processing system according to the present embodiment.

First, a user activates the AC device 300B using the control device 200 (Step S20). For example, by operating the control device 200 of the AC device 300B, an infrared communication control code is transmitted from the control device 200 in the infrared communication scheme.

At this time, the information processing device 100-1 receives infrared communication control information transmitted from the control device 200 and specifies device information from the received infrared communication control information. Then, the information processing device 100-1 notifies the user of the specified device information (Step S21). For example, the information processing device 100-1 receives an infrared communication control code to be transmitted to the AC device 300B from the control device 200, and specifies device information of the AC device 300B to be stored in the storage unit 126, for example, the fact that the device type is an AC device, the manufacturer is ABC company, and the like on the basis of the infrared communication control code. Then, the information processing device 100-1 notifies the user of the specified device information. Note that the notification may also indicate checking of the user. That is, in a case in which the user responds to the notification that the specified device information is wrong, the information processing device 100-1 may request the user for a process corresponding to the response of the user, for example, re-transmission of an infrared signal.

Next, the information processing device 100-1 notifies the user of the fact that a voice input that is compatible with the infrared communication scheme is available. For example, the information processing device 100-1 notifies the user using voice that the AC device 300B can be controlled through a voice input. Note that the notification process of the UI may also be performed in accordance with a user's response to the notification of the UI in a manner similar to that described above.

Thereafter, the information processing device 100-1 controls the AC device 300B on the basis of a user's voice input.

Note that it is a matter of course that the AC device 300B may be controlled by the user operating the control device 200. Therefore, the user can choose a UI of the AC device 300B to be used in accordance with the user's circumstances.

Summary of First Embodiment

According to the first embodiment of the present disclosure, the information processing device 100-1 determines a UI for controlling the control target device 300 in accordance with a communication scheme between the control target device 300 and the information processing device 100-1 for controlling the control target device 300 and controls notification of the determined UI to the user as described above. Therefore, the available UI is determined in accordance with the communication scheme between the information processing device 100-1 and the control target device 300, and the user is notified of the available UI. In this manner, it is possible to increase the possibility that the user will notice another available UI that the user has not recognized. Therefore, the user can select a UI that is more suitable to the user, and the user's convenience can be improved in terms of the control of the control target device. Further, since the information processing device 100-1 notifies the user, the user can notice the other UI with no burden imposed on the user.

In addition, the aforementioned communication scheme includes a communication scheme specified on the basis of reception of first control information for controlling the control target device 300 transmitted from the control device 200. Therefore, it is possible to reduce the possibility of failure of the control of the control target device 300 performed using the UI that has been notified of by specifying the communication scheme for controlling the control target device 300 on the basis of the control of the control target device 300 that has actually been performed by the control device 200. That is, the possibility of failure of the control using the UI of which the user has been notified decreases. Therefore, it becomes possible to improve the user's faith in the UI of which the user has been notified.

In addition, the communication scheme specified on the basis of the reception of the first control information includes a first communication scheme that is used for receiving the first control information, and the information processing device 100-1 determines the first UI that is compatible with the first communication scheme. Here, the first control information is information that has been communicated for actual control performed by the control device 200. Therefore, it is possible to further reduce the possibility of failure of the communication of the first control information by transmitting the received first control information using the communication scheme that has been actually used for communicating the first control information.

In addition, the communication scheme specified on the basis of the reception of the first control information includes a second communication scheme for controlling the control target device 300 using a control application of the control target device 300 or second control information for controlling the control target device 300 specified on the basis of the received first control information. Then, information processing device 100-1 determines a second UI that is compatible with the second communication scheme. Therefore, it is possible to increase the possibility that a different UI will be provided to the user using a communication scheme different from the communication scheme that is used for communicating the first control information.

Therefore, it is possible to widen options of UIs for the user. In addition, even in a case in which the same UI is provided, it is possible to prevent the control target device 300 from not being able to be controlled when the communication of the first control information becomes unavailable.

In addition, the communication scheme includes a communication scheme specified on the basis of identification information received from the control target device 300 that identifies the control target device 300. Therefore, even in a case in which the control information is not received from the control device 200, it is possible to provide the user with a notification for controlling the control target device 300. For example, the user is notified of the UI for controlling the control target device 300 merely by connecting the control target device 300 and the information processing device 100-1 to each other via a network. Therefore, it is possible for the user to obtain information about the UI for controlling the control target device 300 without performing additional actions.

In addition, the communication scheme specified on the basis of the identification information includes the second communication scheme, and the information processing device 100-1 determines a second UI that is compatible with the second communication scheme. Therefore, accuracy of the specified control information is secured by the control information being specified on the basis of the identification information obtained from the control target device 300 that is to communicate with the information processing device 100-1. Therefore, it is possible to reduce the possibility of failure of the control of the control target device 300 performed using the second UI.

In addition, the communication scheme specified on the basis of the identification information includes the first communication scheme, and the information processing device 100-1 determines the first UI that is compatible with the first communication scheme. Therefore, it is possible to increase the possibility that a different UI will be provided to the user using a communication scheme that is different from the communication scheme that is used for communicating the second control information. Therefore, it is possible to widen options of UIs for the user. In addition, even in a case in which the same UI is provided, it is possible to prevent the control target device 300 from not being able to be controlled when the communication of the second control information becomes unavailable.

In addition, the first communication scheme includes an infrared communication scheme. Here, there are a large number of home appliances that employ control of the control target device 300 using infrared communication. Therefore, according to this configuration, it is possible to apply the information processing system according to the embodiment to control systems in existing home appliances by causing remote controllers of the home appliances to serve as control devices 200 and causing the home appliances to serve as control target devices 300. Therefore, it is only necessary for the user to install the information processing device 100-1, and it becomes possible to easily introduce the information processing system according to the embodiment.

In addition, the second communication scheme includes a LAN communication scheme. Recent home appliances have technology for connecting a plurality of home appliances with a LAN. Therefore, according to this configuration, it is possible to apply the information processing system according to the embodiment to control systems in existing home appliances by causing the home appliances with the LAN communication functions to serve as control target devices 300. Therefore, it is possible for the user to utilize the information processing system according to the embodiment merely by connecting the information processing device 100-1 with home appliances on a LAN.

In addition, the first UI includes a voice input. Therefore, it is possible to control the control target device 300 without performing an operation of operating the control device 200 or the like. Therefore, the user can control the control target device 300 while performing another operation, and it is possible to improve user convenience.

In addition, the second UI includes a control application of the control target device 300. Here, there is control that is not suitable for an instruction through a voice input. Examples of such control include sound volume adjustment and the like. Thus, it is possible for the user to more easily perform the control that is not suitable for the voice input when the user is notified of the control application as in this configuration.

In addition, the information processing device 100-1 controls the control target device 300 on the basis of an input using the UI that is notified of. Therefore, it is possible to secure the reliability that the control of the control target device 300 using the UI will be performed because the information processing device 100-1 that has notified of the UI controls the control target device 300 via the UI. In addition, it is possible to allow the user to utilize the UI without causing the user to perform additional operations by preparing the process related to the control of the control target device 300 using the UI.

In addition, the notification to the user includes a notification using voice. Therefore, it is possible to make the notification of the UI to the user easily noticeable by the user. In addition, even in a case in which it is difficult for the user to direct his or her line of sight to the information processing device 100-1, it is possible to allow the user to notice the notification of the UI. In addition, the notification to the user includes a notification using display. In this case, it is possible to allow the user to easily notice the notification of the UI even when the information processing device 100-1 is installed in an environment in which it is difficult for the user to hear sound. Note that voice and display may be used together to provide the notification to the user.

2-7. Modification Examples

The first embodiment of the present disclosure has been described above. Note that the embodiment is not limited to the aforementioned example. Hereinafter, modification examples of the embodiment will be described.

Figure 12:
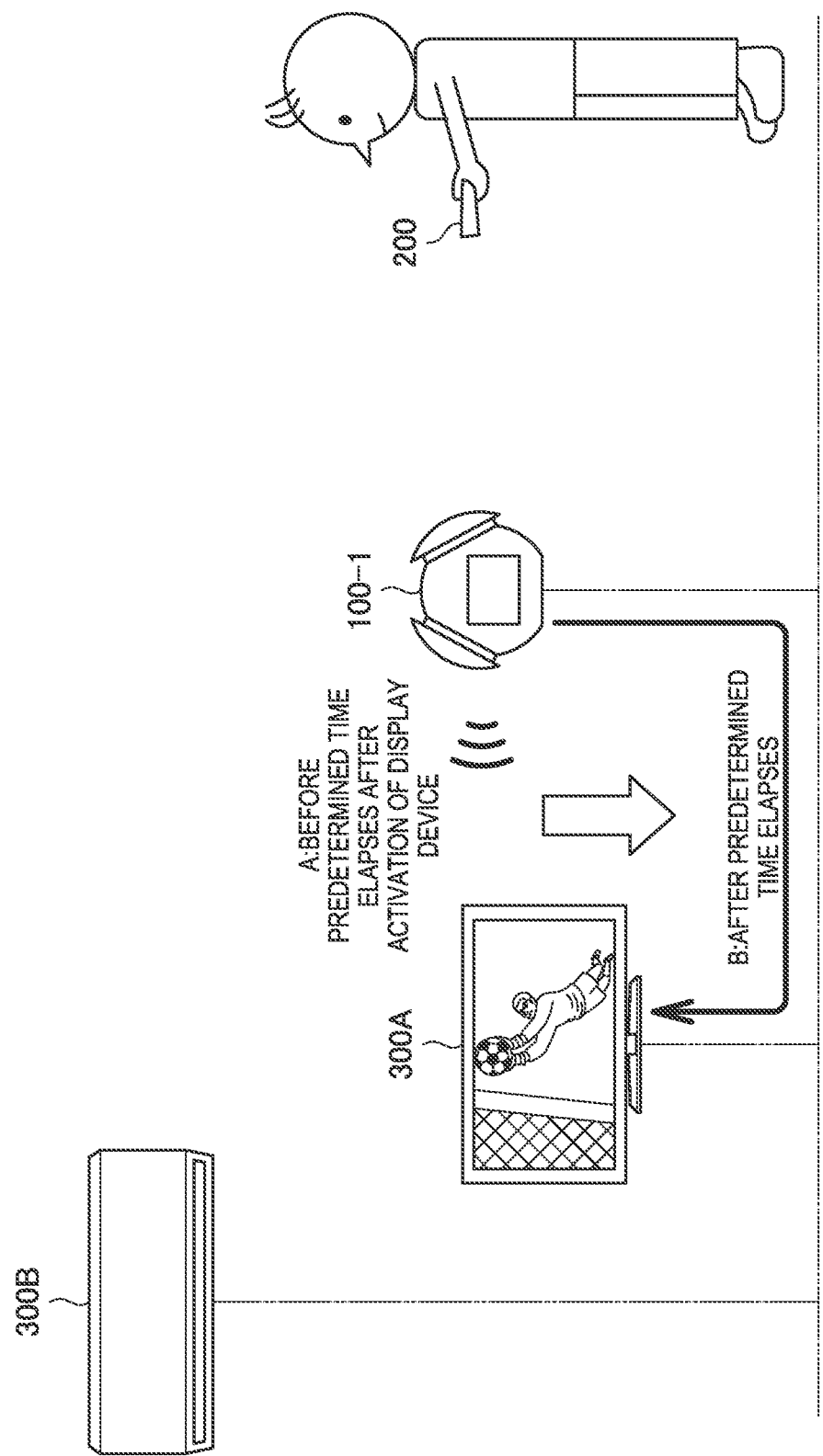
FIG. 12 is a diagram for describing a processing example of an information processing system according to a modification example of the embodiment.

In a modification example of the embodiment, the information processing device 100-1 may select one communication scheme from among a plurality of communication schemes in a case in which the plurality of communication schemes with the control target device 300 are available. Specifically, the control unit 124 selects a communication scheme in accordance with a state of the control target device 300 in a case in which there are a plurality of communication schemes between the control target device 300 and the information processing device 100-1. More specifically, the control unit 124 selects the communication scheme in accordance with a state related to activation of the control target device 300. Further, a process according to the modification example will be described in detail with reference to FIG. 12. FIG. 12 is a diagram for explaining an example of processing performed by the information processing system according to the modification example of the embodiment. Note that a case in which the infrared communication scheme and the LAN communication scheme are available between the information processing device 100-1 and the control target device 300 is assumed in the following description.

The control unit 124 calculates an elapsed time from the activation of the control target device 300 if an input is provided via the UI that has been notified of by the information processing device 100-1. For example, if a voice input is provided to the information processing device 100-1 by the user, and control instruction information is provided from the voice processing unit 128, the control unit 124 calculates the elapsed time from the activation of the display device 300A as a target of control by the voice input.

Next, the control unit 124 selects a communication scheme with the control target device 300 on the basis of the calculated elapsed time from the activation. In a case in which the calculated elapsed time from the activation is less than a predetermined time, that is, in the state of (A) of FIG. 12, for example, the control unit 124 selects the infrared communication scheme. In contrast, in a case in which the calculated elapsed time from the activation is equal to or greater than the predetermined time, that is, in the state of (B) of FIG. 12, the control unit 124 selects the LAN communication scheme. This is because the LAN communication function does not become available until the predetermined time elapse from activation of the device. Note that, in a case in which the control target device 300 is in a non-activated state, the infrared communication scheme is selected for a similar reason.

Next, the control unit 124 controls the control target device 300 by using the selected communication scheme. In a case in which the infrared communication scheme is selected, that is, in the state of (A) of FIG. 12, for example, the control unit 124 specifies an infrared communication control code corresponding to control instruction information and causes the infrared communication unit 120 to transmit the specified infrared communication control code. In addition, in a case in which the LAN communication scheme is selected, that is, in the state of (B) of FIG. 12, the control unit 124 specifies API information corresponding to the control instruction information and causes the LAN communication unit 122 to transmit the specified API information. Note that, in a case in which the UI used for providing the input is a control application, application input information provided from the control application is transmitted as the control information by the LAN communication unit 122.

The example in which a communication scheme is selected in accordance with a state related to activation of the control target device 300 has been described above. However, the communication scheme may be selected in a manner different from that in the aforementioned process. For example, the control unit 124 may select a communication scheme in accordance with a communication state of the control target device 300.

Specifically, if the input using the UI that has been notified of is provided, the control unit 124 determines availability of each communication scheme and causes the control information to be transmitted using an available communication scheme. For example, the infrared communication unit 120 and the LAN communication unit 122 determine availability of communication by periodically attempting communication with the control target device 300. If the control instruction information is provided from the voice processing unit 128, the control unit 124 selects an available communication scheme on the basis of the availability of communication determined by the infrared communication unit 120 and the LAN communication unit 122. Then, the selected communication scheme is used for controlling the control target device 300. Note that the availability of communication may be determined on the basis of stability of the communication. In addition, a communication speed or communication priority may be used instead of the availability of communication.

Note that, in a case in which there is a communication scheme that is provided but is difficult to utilize as a function, the information processing device 100-1 may notify the user of the communication scheme. Specifically, the control unit 124 specifies communication schemes that are provided as functions by the information processing device 100-1 and the control target device 300. Next, in a case in which there is a communication scheme that is difficult to utilize among the specified communication schemes, the control unit 124 causes the voice output unit 130 to output a notification related to the communication scheme that is difficult to utilize through the voice processing unit 128. In a case in which the control target device 300 is provided with the LAN communication function while the information processing device 100-1 and the control target device 300 are not connected to each other, for example, the information processing device 100-1 outputs voice indicating that it is possible to establish LAN communication with the control target device 300 or indicating content encouraging the LAN communication connection. In this case, options of the UIs are widened, and user convenience is thus improved.

As described above, according to the modification example of the embodiment, the information processing device 100-1 selects a communication scheme in accordance with a state of the control target device 300 in a case in which there are a plurality of communication schemes between the control target device 300 and the information processing device 100-1. Therefore, the control information is communicated using the communication scheme suitable for the state of the control target device 300, and reliability and responsiveness of the control of the control target device 300 can thus be improved. Therefore, it is possible to improve a degree of satisfaction of the user who controls the control target device 300 via the UI provided by the information processing device 100-1.

In addition, the state of the control target device 300 includes a state related to activation of the control target device 300. Therefore, it is possible to implement a period until a predetermined time elapses after the activation with another communication scheme. Therefore, it is possible to prevent the control target device 300 from not being able to be controlled in the period. In addition, the state of the control target device 300 includes a communication state of the control target device 300. Therefore, by selecting the communication scheme on the basis of direct determination about availability of the communication, it is possible to more reliably prevent the state in which the control target device 300 cannot be controlled.

3. Second Embodiment (Proposal of Control of Control Target Device)

The first embodiment of the present disclosure has been described above. Next, a second embodiment of the present disclosure will be described. In the second embodiment, an information processing device 100-2 learns a relationship between a condition under which control of a control target device 300 is performed and the control and proposes control of the control target device 300 to a user on the basis of a learning result.

3-1. Logical Configuration of System

Figure 13:
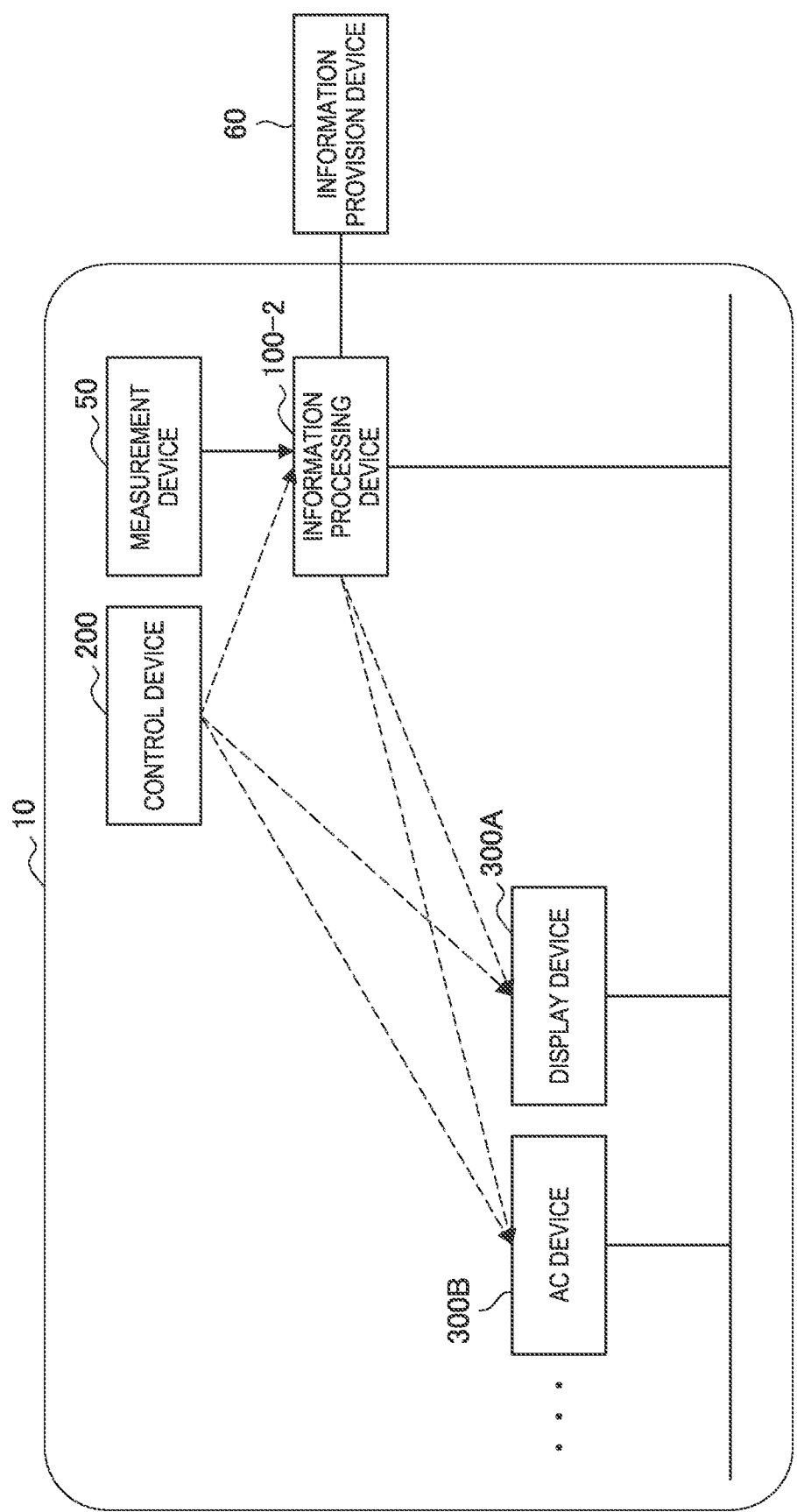
FIG. 13 is a diagram illustrating an example of a schematic logical configuration of an information processing system according to a second embodiment of the present disclosure.

First, a logical configuration of an information processing system according to the second embodiment of the present disclosure will be described. FIG. 13 is a diagram illustrating a schematic logical configuration example of the information processing system according to the embodiment. Note that description of configurations that are substantially the same as the logical configurations in the first embodiment will be omitted.

In addition to the information processing device 100-2, a control device 200, a display device 300A, and an AC device 300B, the information processing system includes a measurement device 50 and an information provision device 60 as illustrated in FIG. 13. In addition, the measurement device 50 and the information provision device 60 are connected to the information processing device 100-2 via communication. For example, the measurement device 50 and the information processing device 100-2 are connected to each other via LAN communication or a signal line, and the information provision device 60 and the information processing device 100-2 are connected to each other via Internet communication or a wide area network (WAN) communication. Note that it is assumed that the measurement device 50 is installed in an indoor space 10 while the information provision device 60 is installed outside of the indoor space 10.

The measurement device 50 measures an aspect of a specific phenomenon. Specifically, the measurement device 50 measures presence or a degree of a specific phenomenon in a space in which the measurement device 50 is installed or in an object on which the measurement device 50 is installed. The measurement device 50 generates measurement information obtained by the measurement and transmits the generated measurement information to the information processing device 100-2. For example, the measurement device 50 is a sensor that measures a temperature, moisture, luminance, sound, presence of persons or objects in the indoor space 10 or a body temperature, sweating, pulse, acceleration, or an angular velocity of a person who wears the measurement device 50.

The information provision device 60 provides various kinds of information to the information processing device 100-2. Specifically, the information provision device 60 provides information related content of processes performed by the control target device 300, information related to conditions outside the indoor space 10, or time information to the information processing device 100-2. For example, the information provision device 60 provides channel information of content to be displayed on the display device 300A, weather information, event information, clock time information, or a time zone to the information processing device 100-2. Note that the information provision device 60 may provide information in response to a request for providing information from the information processing device 100-2 and may provide information at a predetermined timing.

3-2. Logical Configuration of Device

Figure 14:
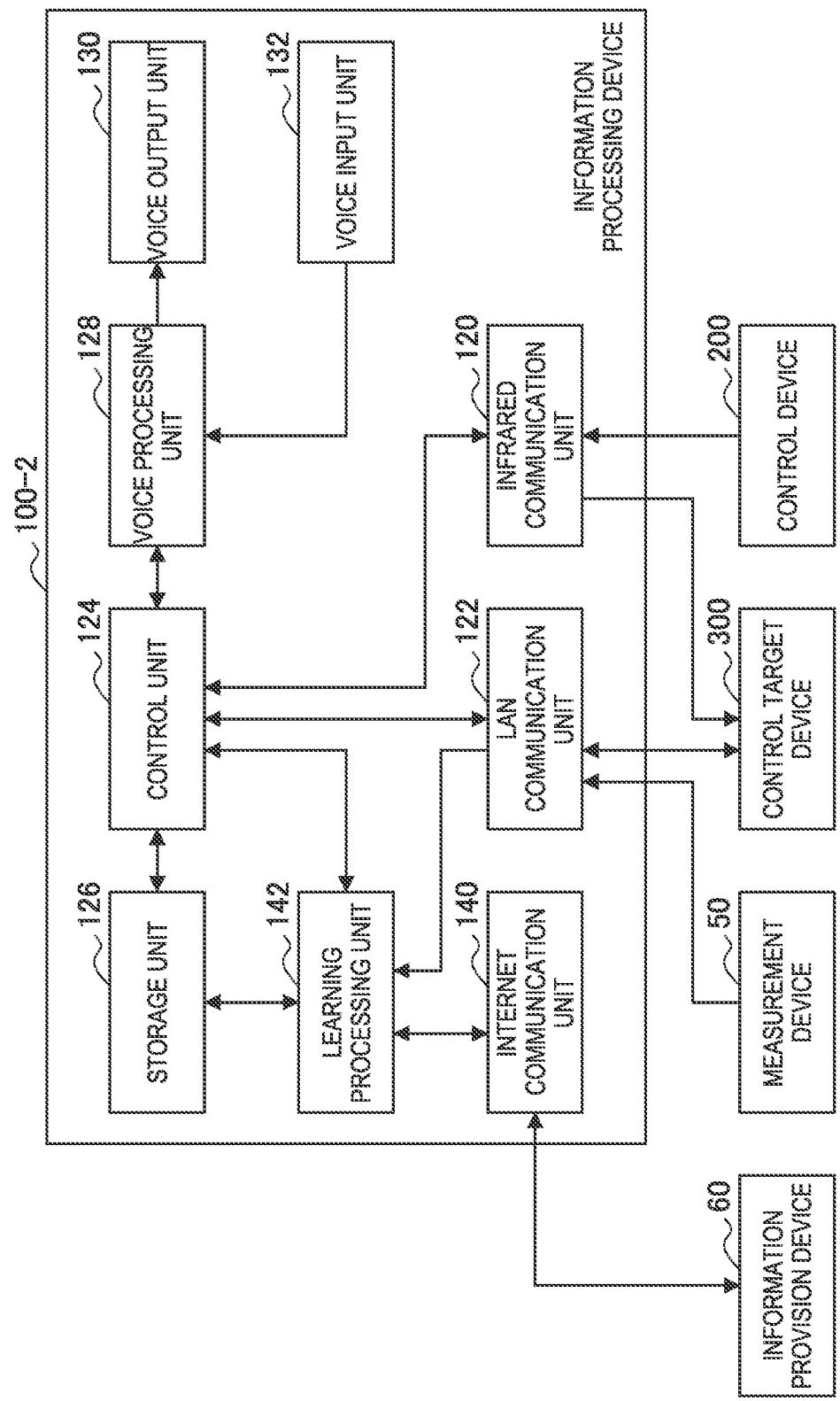
FIG. 14 is a diagram illustrating an example of a schematic logical configuration of an information processing device according to the embodiment.

Next, a logical configuration example of the information processing device 100-2 according to the embodiment will be described with reference to FIG. 14. FIG. 14 is a diagram illustrating a schematic logical configuration example of the information processing device 100-2 according to the embodiment. Note that since a physical configuration of the information processing device 100-2 is substantially the same as a physical configuration of the information processing device 100-1, description thereof will be omitted.

The information processing device 100-2 includes an Internet communication unit 140 and a learning processing unit 142 in addition to an infrared communication unit 120, a LAN communication unit 122, a control unit 124, a storage unit 126, a voice processing unit 128, a voice output unit 130, and a voice input unit 132 as illustrated in FIG. 14.

(LAN Communication Unit)

The LAN communication unit 122 communicates with the measurement device 50 in addition to the control target device 300. Specifically, the LAN communication unit 122 receives measurement information from the measurement device 50.

(Internet Communication Unit)

The Internet communication unit 140 communicates with an external device via the Internet. Specifically, the Internet communication unit 140 receives various kinds of information from the information provision device 60. In addition, the Internet communication unit 140 transmits a request for providing information to the information provision device 60 on the basis of an instruction from the learning processing unit 142.

(Learning Processing Unit)

The learning processing unit 142 learns, as a learning unit, a control pattern of the control target device 300. Specifically, the learning processing unit 142 learns a relationship between information related to a condition when an input using the UI that has been notified of (hereinafter, also referred to as a relationship between the condition and the control) is provided and control of the control target device 300 performed on the basis of the input using by the UI that has been notified of. If the input using the UI provided by the information processing device 100-2 is performed by the user, for example, the learning processing unit 142 obtains control information specified on the basis of the input from the control unit 124. If the control information is obtained, the learning processing unit 142 acquires measurement information received from the LAN communication unit 122 and various kinds of information received from the Internet communication unit 140 as the information related to the condition. Then, the learning processing unit 142 learns a relationship of the acquired measurement information, various kinds of information, and control information. Note that a parameter of a discriminator that discriminates the relationship between the condition and the control is generated as a learning result and that the parameter of the discriminator is stored in the storage unit 126. A discrimination result is also changed by the parameter of the discriminator being changed. Therefore, it is also possible to state that the learning processing unit 142 generates the discriminator.

In addition, the learning processing unit 142 discriminates, as a discrimination unit, control of the control target device 300 on the basis of the learned control pattern. Specifically, the learning processing unit 142 discriminates control of the control target device 300 on the basis of the learned relationship between the condition and the control and the information related to the condition. For example, the learning processing unit 142 has the discriminator and acquires control information as an output from the discriminator by inputting the measurement information and the various kinds of information acquired at a predetermined timing to the discriminator. In other words, the learning processing unit 142 discriminates presence and a degree of control of the control target device 300 by using the discriminator.

(Control Unit)

The control unit 124 controls a notification about a proposal of control of the control target device 300 to the user. Specifically, the control unit 124 notifies the user of a proposal of control of the control target device 300 discriminated by the learning processing unit 142 through the voice processing unit 128 and the voice output unit 130. For example, if a discrimination result indicating that the control target device 300 is to be controlled is provided by the learning processing unit 142, the control unit 124 generates a message indicating content and a degree of the control. Next, the control unit 124 provides the generated message to the voice processing unit 128. Then, voice information is generated from the message by the voice processing unit 128, and voice is output on the basis of the voice information generated by the voice output unit 130.

(Storage Unit)

The storage unit 126 stores a learning result of the control pattern of the control target device 300. Specifically, the storage unit 126 stores a parameter of the discriminator obtained by the learning of the control pattern performed by the learning processing unit 142.

3-3. Process of Device

Next, a process of the information processing device 100-2 according to the embodiment will be described.

Figure 15:
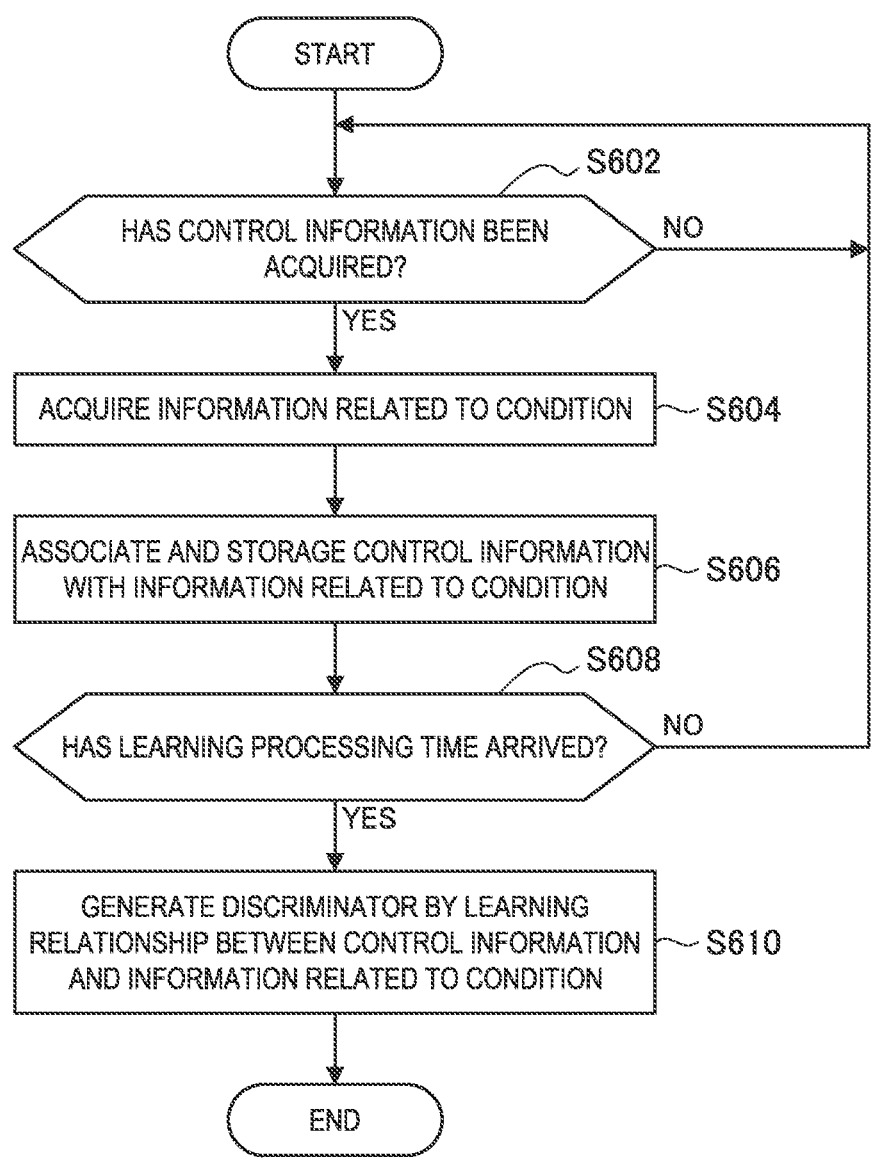
FIG. 15 is a flowchart conceptually illustrating a learning process of a control pattern of a control target device by the information processing device according to the embodiment.

First, a learning process of a control pattern of the control target device 300 performed by the information processing device 100-2 will be described with reference to FIG. 15. FIG. 15 is a flowchart conceptually illustrating the learning process of the control pattern of the control target device 300 performed by the information processing device 100-2 according to the embodiment.

The information processing device 100-2 determines whether or not control information has been acquired (Step S602). Specifically, the learning processing unit 142 determines whether the control information (for example, infrared communication control information, application input information, or API information) has been provided from the control unit 124.

If the control information is acquired, the information processing device 100-2 acquires information related to a condition (Step S604). Specifically, if the control information has been provided, the learning processing unit 142 acquires measurement information received by the LAN communication unit 122 and various kinds of information received by the Internet communication unit 140.

Next, the information processing device 100-2 associates and stores the control information with the information related to the condition (Step S606). Specifically, the learning processing unit 142 causes the storage unit 126 to temporarily associate and store the acquired control information with the measurement information and the various kinds of information.

The information processing device 100-2 determines whether or not a learning process time has arrived (Step S608). Specifically, the learning processing unit 142 determines whether or not the learning process time has arrived on the basis of the time information.

If the learning process time has arrived, the information processing device 100-2 generates a discriminator through learning of a relationship between the control information and the information related to the condition (Step S610). Specifically, if the learning process time has arrived, the learning processing unit 142 generates a parameter of the discriminator that discriminates the control information from the relationship of the control information and the measurement information and the various kinds of information stored in the storage unit 126.

Figure 16:
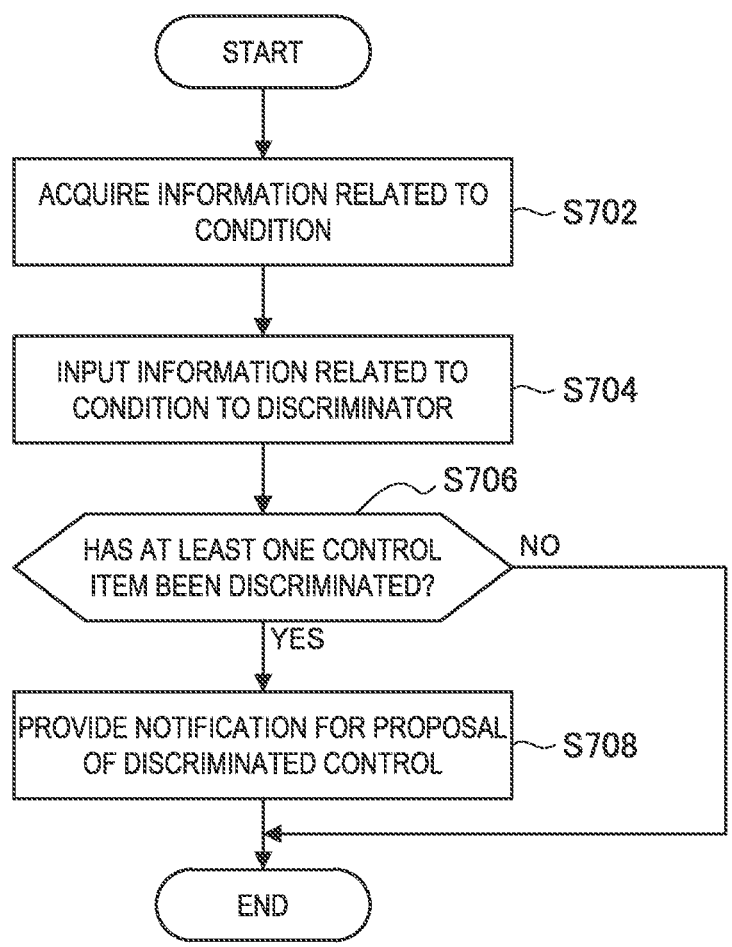
FIG. 16 is a flowchart conceptually illustrating a notification process for a proposal for control of the control target device performed by the information processing device according to the embodiment.

Subsequently, a notification process for a proposal of control of the control target device 300 performed by the information processing device 100-2 will be described with reference to FIG. 16. FIG. 16 is a flowchart conceptually illustrating a notification process for a proposal of the control of the control target device 300 performed by the information processing device 100-2 according to the embodiment.

The information processing device 100-2 acquires the information related to the condition (Step S702). Specifically, the learning processing unit 142 acquires the measurement information and the various kinds of information at a predetermined timing. Note that the process of the flowchart may be started at a predetermined timing.

Next, the information processing device 100-2 inputs the acquired information related to the condition to the discriminator (Step S704). Specifically, the learning processing unit 142 inputs the acquired measurement information and the various kinds of information to the discriminator stored in the storage unit 126.

Next, the information processing device 100-2 determines whether or not at least one control item has been discriminated by the discriminator (Step S706). Specifically, the learning processing unit 142 determines whether or not at least one control information item has been output from the discriminator.

If the at least one control item has been discriminated, the information processing device 100-2 notifies the user of a proposal of the discriminated control (Step S708). Specifically, if at least one control information item has been output from the discriminator, the learning processing unit 142 provides the control information to the control unit 124. The control unit 124 generates a message indicating a proposal of control of the control target device 300 on the basis of the provided control information and provides the generated message to the voice processing unit 128. The provided message is converted into voice information by the voice processing unit 128, and voice is output by the voice output unit 130 on the basis of the converted voice information.

3-4. Application Example

Figure 17:
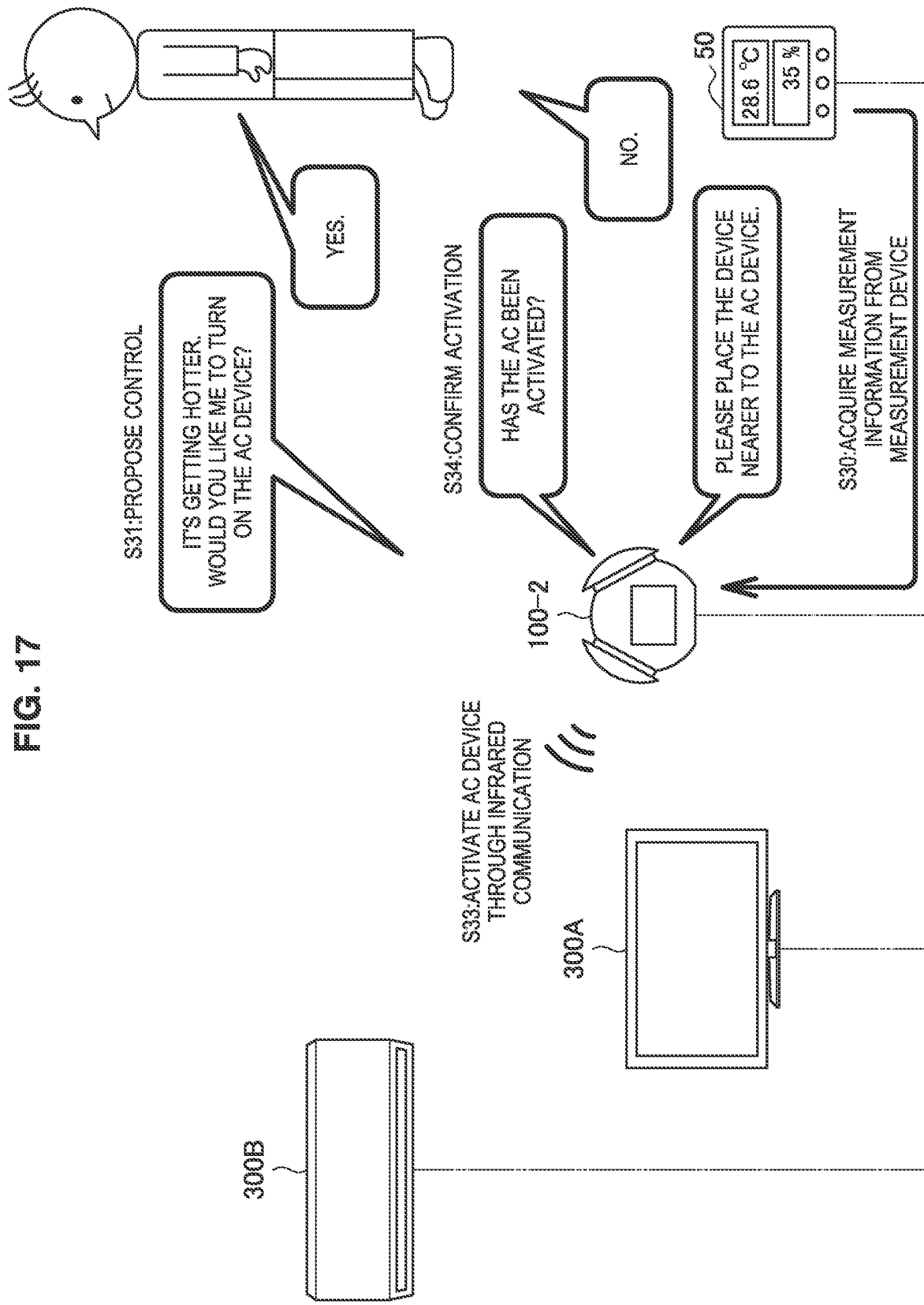
FIG. 17 is a diagram for describing an application example of the information processing system according to the embodiment.

The configuration and the process of the information processing device 100-2 have been described above. Next, an application example of the information processing system provided with the information processing device 100-2 will be described with reference to FIG. 17. FIG. 17 is a diagram for explaining an application example of the information processing system according to the embodiment.

The information processing device 100-2 acquires measurement information from the measurement device 50 (Step S30). For example, the information processing device 100-2 periodically acquires temperature information, for example, as the measurement information from the measurement device 50.

In a case in which it is discriminated from the measurement information that the AC device 300B is under a condition that it is preferable to activate the AC device 300B, the information processing device 100-2 provides a notification for a proposal of activation of the AC device 300B (Step S31). For example, the information processing device 100-2 inputs acquired temperature information to the discriminator. If the control information to activate the AC device 300B is output from the discriminator, the information processing device 100-2 notifies the user using voice of a proposal that the AC device 300B is to be activated as illustrated in FIG. 17.

If a response that the proposal is accepted is provided from the user, the information processing device 100-2 activates the AC device 300B as proposed (Step S33). For example, if voice with content that agrees with the proposal is input after the notification of the proposal, and in a case in which the control information related to the proposal is an infrared communication control code, the information processing device 100-2 transmits the infrared communication control code to the AC device 300B by using the infrared communication scheme. Note that the learning result, that is, the parameter of the discriminator may be updated on the basis of whether or not the proposal has been accepted.

After the activation of the AC device 300B is controlled, the information processing device 100-2 confirms with the user about whether or not the AC device 300B has been activated as proposed (Step S34). For example, the information processing device 100-2 notifies the user of a message for checking whether or not the AC device 300B has been activated after the transmission of the infrared communication control code. In a case in which a response indicating that the AC device 300B has not been activated is provided from the user, the information processing device 100-2 notifies the user of a message for encouraging the user to place the information processing device 100-2 nearer to the AC device 300B.

3-5. Summary of Second Embodiment

According to the second embodiment of the present disclosure, the information processing device 100-2 learns the control pattern of the control target device 300 and discriminates control of the control target device 300 on the basis of the learned control pattern as described above. Then, the information processing device 100-2 provides a notification for a proposal of the control of the discriminated control target device 300. Therefore, it is possible to propose the control of the control target device 300 at a timing at which there is a possibility that the user controls the control target device 300. Therefore, it becomes possible for the user to concentrate on their own operations without being aware of the control of the control target device 300. In addition, it is also possible to prevent the control of the control target device 300 from being forgotten.

In addition, the control pattern includes a relationship between the information related to the condition when the input using the UI that has been notified of is performed and the control of the control target device 300 performed on the basis of the input using the UI that has been notified of. Then, the information processing device 100-2 discriminates the control of the control target device 300 on the basis of the learned relationship and the information related to the condition. Therefore, it is possible to propose the control under a condition that corresponds to or is similar to the condition under which the control has actually been performed. Therefore, it becomes possible to prevent the control from being proposed under a condition that is not desirable for the user.

In addition, the information related to the condition includes measurement information related to an aspect of a specific phenomenon in the surroundings of the user. Therefore, it is possible to improve accuracy in the discrimination of the control by the relationship between the condition and the control being learned in accordance with an environment in which the user stays.

4. CONCLUSION

According to the first embodiment of the present disclosure, an available UI is determined in accordance with the communication scheme between the information processing device 100-1 and the control target device 300, and a notification of the available UI is provided to the user as described above. In this manner, it is possible to improve the possibility that the user ascertain another available UI that the user themselves has not recognized. Therefore, the user can select a UI that is more suitable for the user themselves, and it becomes possible to improve user's convenience for the control of the control target device. Further, since the notification is provided from the information processing device 100-1 to the user, the user can ascertain another UI without a burden imparted on the user themselves.

In addition, according to the second embodiment of the present disclosure, it is possible to propose the control of the control target device 300 at a timing with a possibility that the user controls the control target device 300. Therefore, it becomes possible for the user to concentrate on their own operations without being aware of the control of the control target device 300. In addition, it is possible to prevent the control of the control target device 300 from being forgotten.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the notification of the UI for the control via the information processing device 100 is provided in the aforementioned embodiments, for example, the present technology is not limited to such an example. Specifically, a notification of a UI for control that is performed not via the information processing device 100 may be provided. For example, a notification of a control application of the control target device 300 that is installed in a terminal capable of performing LAN communication with the control target device 300 may be provided. In addition, a notification of encouraging the user to install the control application may be provided. Note that the terminal may be the control device 200, and in this case, the control device 200 is an information communication terminal such as a smartphone.

In addition, although the example in which the UI determination process, the UI notification control process, and all the control process of the control target device 300 are performed by the information processing device 100 installed in the indoor space 10 has been described in the aforementioned embodiments, a part or an entirety of these processes may be performed by a device installed outside the indoor space 10. For example, a part or an entirety of these processes may be performed by an external server as in a cloud service.

In addition, although the example in which the information processing device 100 is a stationary device has been described in the aforementioned embodiments, the information processing device 100 may be a mobile communication terminal with portability. For example, the information processing device 100 may be a smartphone, a tablet terminal, a personal digital assistant (PDA), or a wrist watch-type terminal. In addition, the information processing device 100 may not include the voice output unit 130 and the voice input unit 132 and utilize an external voice output device and an external voice input device.

In addition, although the example in which the control of the control target device 300 to be learned is control performed on the basis of the input using the UI that has been notified of has been described in the second embodiments, the control to be learned may be control of the control target device 300 by using the control device 200. For example, if the control information is received from the control device 200 by using the infrared communication scheme, a relationship between the control information and the information related to the condition may be learned.

In addition, although the example in which the learning result based on the information related to the condition is utilized has been described in the second embodiment, a learning result prepared in advance may be utilized. Further, learning may be further accumulated on the basis of the learning result prepared in advance.

In addition, although the example in which the control pattern to be learned is the relationship between the condition and the control has been described in the second embodiment, the present technology is not limited thereto, and another control pattern may be learned. For example, the control pattern to be learned may be a relationship between an execution frequency of control and the control. Particularly, control may be proposed in an order from control with higher execution frequencies, or only control executed at frequencies that are equal to or greater than a threshold value may be proposed.

In addition, although the example in which the control is proposed if the learned condition is met has been described in the second embodiment, the control may be proposed at a timing decided in advance. For example, the control may be periodically proposed for the control executed at a frequency that is equal to or greater than a threshold value.

In addition, although the example in which the control is proposed has been described in the second embodiment, the control may be executed with no proposal. For example, if control information is discriminated by the discriminator from the information related to the condition, the information processing device 100 controls the control target device 300 by using the control information.

In addition, although the example in which the measurement information is used for learning the relationship between the condition and the control has been described in the second embodiment, a user's action may be used for learning the relationship. For example, the information processing device 100 may recognize the user's action from the measurement information or the like and learn a relationship between the recognized action and control information.

In addition, although the example in which the relationship between the condition and the control is learned by using information from the measurement device 50 or the information provision device 60 has been described in the second embodiment, information maintained or generated in the information processing device 100 may be used. For example, clock time information maintained in the information processing device 100 may be used instead of clock time information received from the information provision device 60.

In addition, although the example in which the measurement device 50 is a configuration outside the information processing device 100 has been described in the second embodiment, the measurement device 50 may be incorporated in the information processing device 100.

In addition, the configuration according to the aforementioned respective embodiments can be combined to each other. For example, the information processing device 100 may have both the function of providing a notification of a UI according to the first embodiment and a function of proposing control of the control target device 300 according to the second embodiment.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

In addition, a computer program for causing hardware built in the information processing device 100 to exhibit functions equivalent to those of the above-described respective logical configurations of the information processing device 100 can also be produced. Furthermore, a storage medium in which the computer program is stored is also provided.

Additionally, the present technology may also be configured as below.

(1)

An information processing device including:

a determination unit that determines a user interface for controlling a control target device in accordance with a communication scheme between the control target device and the information processing device for controlling the control target device; and a notification control unit that controls a notification to a user of the user interface that is determined by the determination unit.

(2)

The information processing device according to (1), in which the communication scheme includes a communication scheme specified on a basis of reception of first control information for controlling the control target device that is transmitted from a control device.

(3)

The information processing device according to (2), in which the communication scheme specified on the basis of the reception of the first control information includes a first communication scheme used for the reception of the first control information, and the determination unit determines a first user interface that is compatible with the first communication scheme.

(4)

The information processing device according to (2) or (3), in which the communication scheme specified on the basis of the reception of the first control information includes a second communication scheme for controlling the control target device using a control application for the control target device or second control information for controlling the control target device, which is specified on the basis of the received first control information, and the determination unit determines a second user interface that is compatible with the second communication scheme.

(5)

The information processing device according to any one of (1) to (4), in which the communication scheme includes a communication scheme specified on a basis of identification information with which the control target device is identified, the identification information being received from the control target device.

(6)

The information processing device according to (5), in which the communication scheme specified on the basis of the identification information includes a second communication scheme for controlling the control target device using a control application for the control target device or second control information for controlling the control target device, and the determination unit determines a second user interface that is compatible with the second communication scheme.

(7)

The information processing device according to (5) or (6), in which the communication scheme specified on the basis of the identification information includes a first communication scheme for controlling the control target device using first control information for controlling the control target device, and the determination unit determines a first user interface that is compatible with the first communication scheme.

(8)

The information processing device according to (3) or (7), in which the first communication scheme includes an infrared communication scheme.

(9)

The information processing device according to (4) or (6), in which the second communication scheme includes a local area network (LAN) communication scheme.

(10)

The information processing device according to (3) or (7), in which the first user interface includes a voice input.

(11)

The information processing device according to (4) or (6), in which the second user interface includes the control application.

(12)

The information processing device according to any one of (1) to (11), further including:

a device control unit that controls the control target device on a basis of an input using the user interface.

(13)

The information processing device according to (12), in which the device control unit selects the communication scheme in accordance with a state of the control target in a case in which a plurality of the communication schemes are present.

(14)

The information processing device according to (13), in which the state of the control target device includes a state related to activation of the control target device or a state of communication.

(15)

The information processing device according to any one of (1) to (14), in which a notification provided to the user includes a notification using voice or display.

(16)

The information processing device according to any one of (2) to 4 or 7 to (10), further including:

a learning unit that learns a control pattern of the control target device; and a discrimination unit that discriminates control for the control target device on a basis of the control pattern learned by the learning unit, in which the notification control unit further causes a notification unit to provide a notification for a proposal of control of the control target device discriminated by the discrimination unit.

(17)

The information processing device according to (16), in which the control pattern includes a relationship between information related to a condition when an input is provided by using the user interface and control of the control target device performed on a basis of the input using the user interface, and the discrimination unit discriminates the control of the control target device on a basis of the learned relationship and the information related to the condition.

(18)

The information processing device according to (17), in which the information related to the condition includes measurement information about an aspect of a specific phenomenon in a surrounding of the user.

(19)

An information processing method including, by a processor:

determining a user interface for controlling a control target device in accordance with a communication scheme between the control target device and an information processing device for controlling the control target device; and controlling a notification to a user of the determined user interface.

(20)

A program for causing a computer to realize:

a determination function that determines a user interface for controlling a control target device in accordance with a communication scheme between the control target device and an information processing device for controlling the control target device; and a notification control function that controls a notification to a user of the user interface determined by the determination function.

REFERENCE SIGNS LIST

100 information processing device
120 infrared communication unit
122 LAN communication unit
124 control unit
126 storage unit
128 voice processing unit
130 voice output unit
132 voice input unit
140 Internet communication unit
142 learning processing unit

The invention claimed is:

1. An information processing device, comprising:
a determination unit configured to:
select a communication scheme from a plurality of communication schemes between a control target device and the information processing device, wherein the communication scheme is selected based on one of availability of the communication scheme or a speed of the communication scheme, and the plurality of communication schemes corresponds to a plurality of user interfaces; and determine a first user interface from the plurality of user interfaces for user input of a control instruction to control the control target device, wherein the first user interface is determined based on the selected communication scheme, and the control target device is controlled based on the selected communication scheme between the control target device and the information processing device; and a notification control unit configured to control output of a voice-based notification to a user of the determined first user interface, wherein the voice-based notification includes: information of a type of the control target device, and a mode for the user input of the control instruction to control the control target device by the first user interface.

2. The information processing device according to claim 1, wherein the communication scheme includes a first communication scheme specified based on reception of first control information, the first control information controls the control target device, and the first control information is transmitted from a control device.

3. The information processing device according to claim 2, wherein the first communication scheme specified based on the reception of the first control information includes a second communication scheme used for the reception of the first control information, and the determination unit is further configured to determine the first user interface compatible with the second communication scheme.

4. The information processing device according to claim 2, wherein the first communication scheme specified based on the reception of the first control information includes a third communication scheme for one of:

control the control target device based on a control application for the control target device, or control the control target device based on second control information, wherein the second control information controls the control target device, and the second control information is specified based on the first control information, and the determination unit is further configured to determine a second user interface compatible with the third communication scheme.

5. The information processing device according to claim 1, wherein the communication scheme includes a first communication scheme specified based on identification information with which the control target device is identified, and the identification information is received from the control target device.

6. The information processing device according to claim 5, wherein the first communication scheme specified based on the identification information includes a second communication scheme for one of:

control the control target device based on a control application for the control target device, or control the control target device based on second control information, wherein the second control information is to control the control target device, and the determination unit is further configured to determine a second user interface compatible with the second communication scheme.

7. The information processing device according to claim 5, wherein the first communication scheme specified based on the identification information includes a third communication scheme to control the control target device using first control information, and the determination unit is further configured to determine the first user interface compatible with the third communication scheme.

8. The information processing device according to claim 3, wherein the second communication scheme includes an infrared communication scheme.

9. The information processing device according to claim 4, wherein the third communication scheme includes a local area network (LAN) communication scheme.

10. The information processing device according to claim 3, wherein the first user interface includes a voice input.

11. The information processing device according to claim 4, wherein the second user interface includes the control application.

12. The information processing device according to claim 1, further comprising a device control unit configured to:

generate control information in the selected communication scheme based on the control instruction received in the mode of the first user interface; and transmit the control information to the control target device based on the user input associated with the first user interface.

13. The information processing device according to claim 12, wherein the device control unit is further configured to select the communication scheme based on a state of the control target device.

14. The information processing device according to claim 13, wherein the state of the control target device includes at least one of a state related to activation of the control target device or a state of communication of the control target device.

15. The information processing device according to claim 1, wherein the notification control unit is further configured to provide a display-based notification.

16. The information processing device according to claim 2, further comprising:

a learning unit configured to learn a control pattern of the control target device; and a discrimination unit configured to discriminate control for the control target device based on the control pattern learned by the learning unit, wherein the notification control unit is further configured to cause a notification unit to provide a notification for a proposal of the control of the control target device discriminated by the discrimination unit.

17. The information processing device according to claim 16, wherein the control pattern includes a relationship between information related to a condition in which the user input is received via the first user interface and the control of the control target device performed based on the user input received via the first user interface, and the discrimination unit is further configured to discriminate the control of the control target device based on the relationship and the information related to the condition.

18. The information processing device according to claim 17, wherein the information related to the condition includes measurement information about an aspect of a specific phenomenon in a surrounding of the user.

19. The information processing device according to claim 1, wherein the notification control unit is further configured to:

propose activation of the control target device based on an environment condition around the user; and receive a response to the proposed activation from the user through the first user interface.

20. An information processing method, comprising:

selecting, by a processor, a communication scheme from a plurality of communication schemes between a control target device and a information processing device, wherein the communication scheme is selected based on one of availability of the communication scheme or a speed of the communication scheme, and the plurality of communication schemes corresponds to a plurality of user interfaces;

determining, by the processor, a user interface from the plurality of user interfaces for user input of a control instruction to control the control target device, wherein the user interface is determined based on the selected communication scheme, and the control target device is controlled based on the selected communication scheme between the control target device and the information processing device configured to control the control target device; and controlling, by the processor, output of a voice-based notification to a user of the determined user interface, wherein the voice-based notification includes: information of a type of the control target device, and a mode for the user input of the control instruction to control the control target device by the user interface.

21. A non-transitory computer-readable medium having stored thereon computer-executable instructions that, when executed by a computer, cause the computer to execute operations, the operations comprising:

selecting a communication scheme from a plurality of communication schemes between a control target device and an information processing device, wherein the communication scheme is selected based on one of availability of the communication scheme or a speed of the communication scheme, and the plurality of communication schemes corresponds to a plurality of user interfaces;

determining a user interface from the plurality of user interfaces for user input of a control instruction to control the control target device, wherein the user interface is determined based on the selected communication scheme, and the control target device is controlled based on the selected communication scheme between the control target device and the information processing device configured to control the control target device; and controlling output of a voice-based notification to a user of the determined user interface, wherein the voice-based notification includes: information of a type of the control target device, and a mode for the user input of the control instruction to control the control target device by the user interface.

* * * * *